(12) United States Patent
Rowley et al.

(10) Patent No.: US 9,174,758 B1
(45) Date of Patent: Nov. 3, 2015

(54) CONTINUOUS FLOW PROCESSING OF PACKAGED ITEMS AT ORDER FULFILLMENT CENTERS

(75) Inventors: Peter D. Rowley, Sammamish, WA (US); Jonathan S. Battles, Medina, WA (US)

(73) Assignee: Amazon Technologies, Inc., Reno, NV (US)

( * ) Notice: Subject to any disclaimer, the term of this patent is extended or adjusted under 35 U.S.C. 154(b) by 848 days.

(21) Appl. No.: 13/304,198

(22) Filed: Nov. 23, 2011

Related U.S. Application Data

(60) Provisional application No. 61/502,790, filed on Jun. 29, 2011.

(51) Int. Cl.
*B65C 9/40* (2006.01)

(52) U.S. Cl.
CPC ............. *B65C 9/40* (2013.01); *B65C 2009/401* (2013.01)

(58) Field of Classification Search
CPC .. B65C 9/40; B65C 2009/401; G06Q 10/083; G06Q 10/0833; G06K 2017/401
USPC .................... 156/64, 378; 700/225, 226, 227; 705/330, 337, 338
See application file for complete search history.

(56) References Cited

U.S. PATENT DOCUMENTS

| | | | |
|---|---|---|---|
| 3,689,106 A | 9/1972 | Young | |
| 3,886,713 A | 6/1975 | Mitchell et al. | |
| 3,938,608 A | 2/1976 | Folco-Zambelli | |
| 4,375,354 A | 3/1983 | Henriksson | |
| 4,530,056 A | 7/1985 | MacKinnon et al. | |
| 4,554,724 A | 11/1985 | Bantz | |

(Continued)

FOREIGN PATENT DOCUMENTS

| | | |
|---|---|---|
| EP | 0244984 | 11/1987 |
| EP | 1118573 | 7/2001 |

(Continued)

OTHER PUBLICATIONS

U.S. Appl. No. 13/280,134, filed Oct. 24, 2011, Kevin R. Vliet et al.

(Continued)

*Primary Examiner* — George Koch
(74) *Attorney, Agent, or Firm* — Robert C. Kowert; Meyertons, Hood, Kivlin, Kowert & Goetzel, P.C.

(57) ABSTRACT

Methods and apparatus for material handling in an order fulfillment center. An order fulfillment system may include a pre-shipment package preparation module that receives packaged units, and performs various post-packaging operations to facilitate shipment. Some embodiments may include an alignment section configured to orient received packaged units, a package verification section configured to verify one or more physical parameters of the packaged units, a labeling section configured to automatically apply shipping labels to each packaged unit while the packaged units travel at a constant velocity from the packaging verification section and through the labeling section, thereby applying labeling without need to stop or slow travel of the packaged units through the system. Some embodiments include a routing section that is configured to route each packaged unit to a corresponding shipping path that is selected based on information (e.g., packaged height, customer order information) associated with the given packaged unit.

18 Claims, 13 Drawing Sheets

(56) References Cited

U.S. PATENT DOCUMENTS

| | | | |
|---|---|---|---|
| 4,561,060 A | 12/1985 | Hemond | |
| 4,562,635 A | 1/1986 | Carter | |
| 4,630,216 A | 12/1986 | Tyler et al. | |
| 4,653,002 A | 3/1987 | Barry | |
| 4,657,104 A | 4/1987 | Holland | |
| 4,779,203 A | 10/1988 | McClure et al. | |
| 4,972,917 A | 11/1990 | Matsumoto et al. | |
| 4,993,507 A | 2/1991 | Ohkura | |
| 5,111,401 A | 5/1992 | Everett, Jr. et al. | |
| 5,179,329 A | 1/1993 | Nishikawa et al. | |
| 5,246,332 A | 9/1993 | Bernard, II et al. | |
| 5,280,431 A | 1/1994 | Summerville et al. | |
| 5,283,739 A | 2/1994 | Summerville et al. | |
| 5,301,790 A | 4/1994 | Prydtz et al. | |
| 5,305,217 A | 4/1994 | Nakamura et al. | |
| 5,341,130 A | 8/1994 | Yardley et al. | |
| 5,388,706 A | 2/1995 | Baldur | |
| 5,472,309 A | 12/1995 | Bernard, II et al. | |
| 5,488,277 A | 1/1996 | Nishikawa et al. | |
| 5,568,030 A | 10/1996 | Nishikawa et al. | |
| 5,623,413 A | 4/1997 | Matheson et al. | |
| 5,625,559 A | 4/1997 | Egawa | |
| 5,685,431 A | 11/1997 | Chambers et al. | |
| 5,819,008 A | 10/1998 | Asama et al. | |
| 5,904,727 A | 5/1999 | Prabhakaran | |
| 5,928,294 A | 7/1999 | Zelinkovsky | |
| 5,934,413 A | 8/1999 | Konig et al. | |
| 5,993,045 A | 11/1999 | Schmidtke et al. | |
| 6,138,064 A | 10/2000 | Matsumoto et al. | |
| 6,259,967 B1 | 7/2001 | Hartlepp et al. | |
| 6,285,951 B1 | 9/2001 | Gaskins et al. | |
| 6,289,260 B1 | 9/2001 | Bradley et al. | |
| 6,341,271 B1 | 1/2002 | Salvo et al. | |
| 6,401,936 B1 | 6/2002 | Isaacs et al. | |
| 6,484,886 B1 | 11/2002 | Isaacs et al. | |
| 6,594,535 B1 | 7/2003 | Costanza | |
| 6,600,418 B2 | 7/2003 | Francis et al. | |
| 6,647,316 B2 | 11/2003 | Bahri et al. | |
| 6,652,213 B1 | 11/2003 | Mitchell et al. | |
| 6,669,089 B2 | 12/2003 | Cybulski et al. | |
| 6,672,601 B1 | 1/2004 | Hofheins et al. | |
| 6,694,220 B1 | 2/2004 | Tanz | |
| 6,721,762 B1 | 4/2004 | Levine et al. | |
| 6,748,292 B2 | 6/2004 | Mountz | |
| 6,789,660 B1 | 9/2004 | Bruun et al. | |
| 6,823,236 B2 | 11/2004 | Speckhart et al. | |
| 6,834,229 B2 | 12/2004 | Rafiah et al. | |
| 6,895,301 B2 | 5/2005 | Mountz | |
| 6,950,722 B2 | 9/2005 | Mountz | |
| 7,123,988 B2 | 10/2006 | Russell et al. | |
| 7,586,049 B2 * | 9/2009 | Wurz | 177/25.13 |
| 7,632,367 B2 * | 12/2009 | Smith | 156/64 |
| 7,668,761 B2 | 2/2010 | Jenkins et al. | |
| 7,774,243 B1 | 8/2010 | Antony et al. | |
| 7,826,919 B2 | 11/2010 | D'Andrea et al. | |
| 7,881,820 B2 | 2/2011 | Antony et al. | |
| 7,894,933 B2 | 2/2011 | Mountz et al. | |
| 7,912,574 B2 | 3/2011 | Wurman et al. | |
| 8,068,978 B2 | 11/2011 | D'Andrea et al. | |
| 8,141,330 B2 | 3/2012 | Henkel | |
| 8,170,712 B2 | 5/2012 | Battles et al. | |
| 8,401,975 B1 | 3/2013 | Tian et al. | |
| 8,407,110 B1 | 3/2013 | Joseph et al. | |
| 8,504,413 B1 | 8/2013 | Rowe et al. | |
| 2002/0008005 A1 | 1/2002 | Eguchi | |
| 2002/0154974 A1 | 10/2002 | Fukuda et al. | |
| 2003/0083763 A1 | 5/2003 | Kiyohara et al. | |
| 2003/0218307 A1 | 11/2003 | Anderson et al. | |
| 2004/0010337 A1 | 1/2004 | Mountz | |
| 2004/0064385 A1 | 4/2004 | Tamaki | |
| 2004/0073333 A1 | 4/2004 | Brill | |
| 2004/0153187 A1 | 8/2004 | Knight et al. | |
| 2004/0153379 A1 | 8/2004 | Joyce et al. | |
| 2004/0203633 A1 | 10/2004 | Knauerhase et al. | |
| 2004/0238326 A1 | 12/2004 | Lichti | |
| 2004/0249497 A1 | 12/2004 | Saigh et al. | |
| 2005/0080524 A1 | 4/2005 | Park | |
| 2005/0149226 A1 | 7/2005 | Stevens et al. | |
| 2005/0256639 A1 | 11/2005 | Aleksic et al. | |
| 2005/0278062 A1 | 12/2005 | Janert et al. | |
| 2006/0089787 A1 | 4/2006 | Burr et al. | |
| 2006/0151288 A1 | 7/2006 | Reznik et al. | |
| 2006/0229951 A1 | 10/2006 | Abels et al. | |
| 2006/0235557 A1 | 10/2006 | Knight et al. | |
| 2007/0021864 A1 | 1/2007 | Mountz et al. | |
| 2007/0071585 A1 | 3/2007 | Henkel | |
| 2007/0136152 A1 | 6/2007 | Dunsker et al. | |
| 2007/0198174 A1 | 8/2007 | Williams et al. | |
| 2007/0208498 A1 | 9/2007 | Barker et al. | |
| 2007/0209976 A1 | 9/2007 | Worth et al. | |
| 2007/0246328 A1 * | 10/2007 | Reznik | 198/444 |
| 2007/0293978 A1 | 12/2007 | Wurman et al. | |
| 2007/0294029 A1 | 12/2007 | D'Andrea et al. | |
| 2008/0009965 A1 | 1/2008 | Bruemmer et al. | |
| 2008/0051984 A1 | 2/2008 | Wurman et al. | |
| 2008/0051985 A1 | 2/2008 | D'Andrea et al. | |
| 2008/0093273 A1 | 4/2008 | Stemmle | |
| 2008/0264834 A1 * | 10/2008 | Olsen et al. | 209/547 |
| 2009/0000912 A1 * | 1/2009 | Battles et al. | 198/431 |
| 2009/0112675 A1 | 4/2009 | Servais | |
| 2009/0114041 A1 | 5/2009 | Harish et al. | |
| 2009/0185884 A1 | 7/2009 | Wurman et al. | |
| 2010/0228562 A1 | 9/2010 | Luciano, Jr. et al. | |
| 2010/0241269 A1 | 9/2010 | Ham et al. | |
| 2011/0046877 A1 | 2/2011 | Hoffmann | |
| 2012/0203656 A1 | 8/2012 | Schuh et al. | |
| 2013/0054005 A1 | 2/2013 | Stevens et al. | |
| 2013/0173049 A1 | 7/2013 | Brunner et al. | |
| 2014/0230374 A1 | 8/2014 | Tian et al. | |

FOREIGN PATENT DOCUMENTS

| | | |
|---|---|---|
| EP | 1693319 | 8/2006 |
| FR | 2689488 | 10/1993 |
| WO | 9952091 | 10/1999 |
| WO | 2006044108 | 4/2006 |

OTHER PUBLICATIONS

U.S. Appl. No. 13/280,137, filed Oct. 24, 2011, Kevin R. Vliet et al.
U.S. Appl. No. 13/304,196, filed Nov. 23, 2011, Kevin R. Vliet et al.
"JD Edwards EnterpriseOne Warehouse Management 9.0 Implementation Guide—Working with Replenishment," 2006, Oracle.com, pp. 1-16.

* cited by examiner

CONTINUOUS FLOW PROCESSING OF PACKAGED ITEMS AT ORDER FULFILLMENT CENTERS

This application claims benefit of priority to U.S. Provisional Patent Application No. 61/502,790, filed Jun. 29, 2011. The preceding provisional application is incorporated herein by reference in its entirety. To the extent that material in the Provisional Application conflicts with material expressly set forth herein, the material expressly set forth herein controls.

BACKGROUND

In a distribution system, a retailer or other product distributor (which may collectively be referred to as distributors) typically maintains an inventory of various items at one or more distribution centers, fulfillment centers, cross-docking facilities, materials handling facilities or warehouses (which may collectively be referred to as materials handling facilities). The inventory items are ordered from one or more vendors, received at the materials handling facilities as inbound shipments, and stocked in inventory of the materials handling facilities. In a conventional order fulfillment process, orders for items may be received from customers of the distributor. Units of the ordered items are picked from various locations in the inventory in the materials handling facilities, processed for shipping, and shipped as outbound shipments to the customers.

The facilities operated by the merchant may include various fulfillment processes for fulfilling orders submitted by customers. These processes may operate on items to perform various tasks, such as preparing items for shipment.

Figure 1:
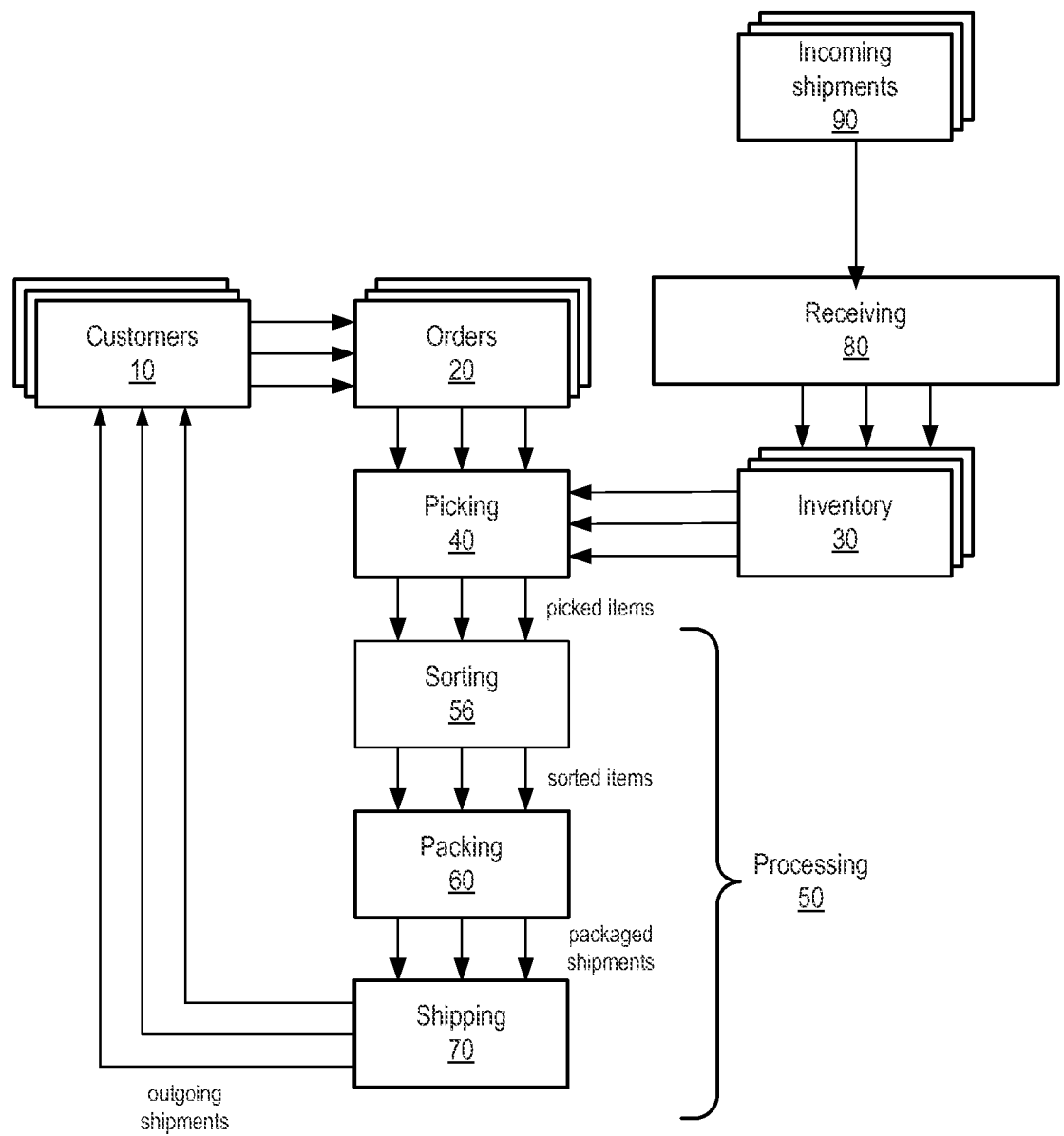
FIG. 1 shows a logical representation of various operations of a materials handling facility, according to some embodiments of the present disclosure.

Specific embodiments are shown by way of example in the drawings and will be described herein in detail. It should be understood, however, that the drawings and detailed description are not intended to limit the claims to the particular embodiments disclosed, even where only a single embodiment is described with respect to a particular feature. On the contrary, the intent is to cover all modifications, equivalents and alternatives falling within the spirit and scope of the present invention as defined by the appended claims. Examples of features provided in the disclosure are intended to be illustrative rather than restrictive unless stated otherwise.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a router module may be configured to receive inventory items, even when the items are not currently being received; a packaging station may be configured to produce a packaged unit, even when certain aspects of activities required in producing the packaged unit are not actively being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

DETAILED DESCRIPTION OF EMBODIMENTS

Various embodiments of methods and apparatus for material handling in an order fulfillment center, using a modular material handling system are described. In some of the described embodiments, an order fulfillment system includes inventory storage, a processing area, and a control system. The inventory storage may in some instances include two storage areas, and in some cases the processing area may be disposed between the two storage areas.

In some embodiments, the processing area may include a router module that is configured to receive inventory items that have been picked from the inventory storage. In some cases, the inventory items may be received by the router module via conveyance receptacles (e.g., totes, bins) that are conveyed using a conveyor mechanism, where the conveyance receptacles are not fixed to the conveyor mechanism. The processing area may also include a plurality of processing modules that may be configured to receive inventory items from the router module. In some instances, the processing modules may receive the inventory items via conveyance receptacles that are conveyed using the conveyor mechanism. In some cases, the processing area may also include a shipping module that is configured to receive packaged inventory items from various ones of the processing modules.

Some of the present embodiments include one or more flexible, modular processing modules that may be configured to receive one or more inventory items that are to be processed for shipment. The received inventory items may correspond to single-item customer orders, or to multi-item customer orders. A pre-packaging station of the processing module may be configured to receive the one or more inventory items and to perform pre-packaging operations to produce a pre-packaged unit. The pre-packaging operations may in some cases include disposing (e.g., placing, fixing, securing) the one or more inventory items onto a pre-packaging substrate or carrier (e.g., a flat sheet, a tray having retaining features, or other packaging fixture). The pre-packaged unit may include the one or more inventory items and the pre-packaging substrate. The processing module may also include an inspection station configured to receive the pre-packaged unit from the pre-packaging station, and to perform inspection operations. The inspection operations may include automatically verifying one or more dimensions of the pre-packaged unit. The processing module may further include a packaging station configured to receive the pre-packaged unit from the inspection station, and also to perform packaging operations to produce a packaged unit. The packaging operations may in some cases include automatically constructing outer packaging around the pre-packaged unit. The packaged unit may include the one or more inventory items, the pre-packaging substrate, and the outer packaging. The flexible, modular processing module may be configured to produce various packaged units conforming to a particular size. The various packaged units may include both the particular packaged unit described above, and at least one other packaged unit that includes a different item from the one or more inventory items of the above-described packaged unit. The processing module may also facilitate conveyance of the various packaged units to one or more shipping modules.

Some of the present embodiments may include a pre-shipment package preparation module that receives packaged units, and performs further operations to facilitate shipment. In some cases, this preparation module may be a part of a flexible, modular processing module that also performs the packaging steps required to produce the packaging units, as discussed above. In other embodiments, the preparation module may be part of a shipping module that may receive packaging units. In some embodiments, the preparation module may be a stand-alone module. The pre-shipment package preparation module may in some cases include an alignment section configured to orient received packaged units, a package verification section configured to verify one or more physical parameters of the packaged units, a labeling section configured to automatically apply shipping labels to each packaged unit while the packaged units travel at a constant velocity from the packaging verification section and through the labeling section (e.g., applying labeling without need to stop or slow travel of the packaged units through the system). Some embodiments include a preparation module having a routing section that is configured to route each packaged unit to a corresponding shipping path that is selected based on information (e.g., packaged height, customer order information) associated with the given packaged unit.

Some embodiments of the present disclosure further include a control system that is operable to cause a particular inventory item to be picked from the inventory storage and to be routed (e.g., via the conveyor mechanism) to the router module of the processing area. Various embodiments include a control system that is further operable to cause the router module to route the particular inventory item to a selected processing module that may perform packaging operations for the particular inventory item. The selected processing module may in some cases be selected based at least in part on the received customer order. For example, a certain processing module may be required if the particular inventory item was part of a multi-item customer order, as opposed to a single-item customer order.

Various embodiments may include a control system that is operable to determine one or more inventory storage zones for storing a replenishment supply of an inventory item. These inventory storage zones may be determined based at least in part on various optimization criteria (e.g., throughput, cost, storage density). In some cases, pick-to-ship time is minimized. In some cases, receive-to-stow time is minimized.

The various operations of a materials handling facility may be located in one building, or alternatively may be spread or subdivided across two or more buildings. In addition, a materials handling facility may include one or multiple levels or floors. For example, a materials handling facility that includes inventory 30 may include one, two, or more levels; in multi-level facilities, inventory 30 may be spread across two or more levels. The total floor space of a materials handling facility may be anywhere from tens of thousands of square feet to more than a million square feet, although embodiments may be implemented in smaller facilities.

FIG. 1 illustrates a logical representation or view of the operation of a materials handling facility in which embodiments of the modular material handling system may be implemented. For example, this figure may illustrate an order fulfillment center of a product distributor. Multiple customers 10 may submit orders 20 to the product distributor, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Picked items may be delivered or conveyed, if necessary, to one or more stations in the materials handling facility for sorting 56 into their respective orders, packing 60, and finally shipping 70 to the customers 10. In some embodiments of the modular material handling system, picked items may be delivered to a singulation station, where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system. A picked, packed and shipped order does not necessarily include all of the items ordered by the customer; an outgoing shipment to a customer may include only a subset of the ordered items available to ship at one time from one inventory-storing location. In some other embodiments, picked items may be delivered to particular destinations via other means, such as automated guided vehicles, pallet jacks, etc.

The picking process 40 as illustrated in FIG. 1 may be implemented in two or more different inventory areas, for example on different floors or in different areas of a materials handling facility. Two or more separate stock storage areas may be maintained and may be physically located on different floors of a materials handling facility. For each separate stock storage area, there may be one or more associated induction stations. Types of items may be, but are not necessarily, stored in different stock storage areas. For example, units of a given type of item may be stowed to locations in storage units in both inventory areas.

A materials handling facility may also include a receiving 80 operation for receiving shipments of stock from one or more sources (e.g., vendors) and for placing the received stock into stock storage. The receiving 80 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities. In various instances, it should be understood that references to elements, units, items, processes (or anything else) as being located within materials handling facility 100 may easily be extended to encompass elements, units, items, processes (or anything else) proximate to but not physically located within materials handling facility. For example, various elements, units, items, or processes (or anything else) may be implemented outside of the materials handling facility, according to some embodiments.

Figure 2:
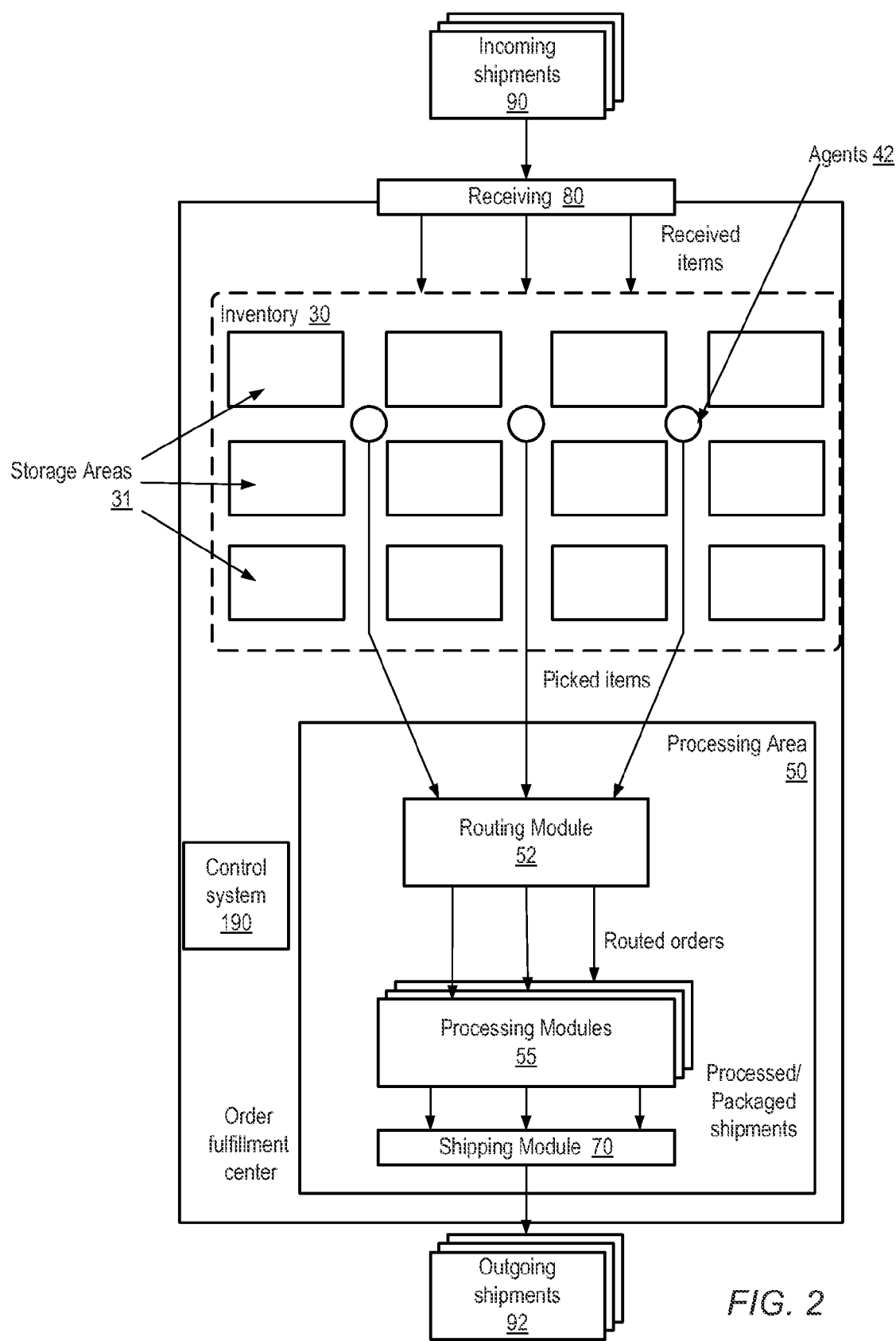
FIG. 2 illustrates an example of a high-level physical layout of a materials handling facility, according to some of the present embodiments.

FIG. 2 illustrates an example of a physical layout of a materials handling facility, such as an order fulfillment facility or center, in which embodiments of the modular material handling system may be implemented. At any one time, one or more agents 42 of the distributor may each be picking items from inventory 30 to fulfill portions or all of one or more requests or orders. This may result in a stream and/or batches of picked items for multiple incomplete or complete orders, which may then be delivered to an induction station (e.g., at routing module 52 or elsewhere within processing area 50). For example, in some instances, picked items in conveyance receptacles (e.g., totes), each containing one or more units of items (each possibly containing items from two or more orders) may be conveyed to any of various inductions stations that may be present, via a conveyance device (e.g., a conveyor belt). In other embodiments, picked items may be conveyed via other means. For example, large items may require transport via pallet jacks or other larger form factors.

At an induction station, each item may be pulled individually from each conveyance receptacle. Alternatively, all items may be "dumped" into a common receptacle (a bin, basket, shelf, etc.), and individual units may then be pulled from the common receptacle. In various embodiments, each pulled unit is then placed into a conveyance receptacle (e.g., a tote or tray) by itself. This process may be referred to as singulating the item. Receptacles, as used herein, may include, but are not limited to, any tote, basket, box, tray, or similar mechanism configured to receive individual units of items or groups of units of items in a materials handling facility. A conveyance receptacle need not be fixed to any conveyance mechanism.

The pulled unit of an item may be associated with the particular conveyance receptacle that it is placed in. In one embodiment, the association of a unit of an item with a particular conveyance receptacle may be performed by reading, scanning or otherwise entering an item identifier associated with the item and a conveyance receptacle identifier associated with the particular conveyance receptacle into which the unit is placed. The item identifier and receptacle identifier may be communicated to a control system 190 of the materials handling facility via wired and/or wireless communications. Each conveyance receptacle may include a unique conveyance receptacle identifier that uniquely identifies the particular conveyance receptacle in the materials handling facility. The conveyance receptacle identifier may, for example, be indicated by a bar code, QR code, Radio Frequency Identifier (RFID) device, or some other scannable or readable mechanism, mark, or tag attached to or integrated with the conveyance receptacle.

Each unit of each item carried in inventory 30 may include an item identifier. A type of item held in inventory 30 may be referred to herein as simply an item. The term item identifier may refer to a unique identifier associated with each particular type of item carried in inventory 30 of a distribution system. The term unit may be used to refer to one (unit) of a type of item. Typically, but not necessarily, each unit is tagged or otherwise marked with the item identifier. For example, units or collections of items in inventory may be marked or tagged with a bar code, Universal Product Code (UPC), Stock-Keeping Unit (SKU) code, serial number, and/or other designation (including proprietary designations) that may be used as item identifiers to facilitate materials handling facility operations, including, but not limited to, stowing, rebinning, picking, sorting, packing and shipping. These designations, or codes, may identify items by type, and/or may identify individual units within a type of item.

Cases, boxes, bundles, or other collections of units of items may similarly be marked or tagged with item identifiers. The units of items in a collection may all be of the same type of item, for example a case of twelve units of a particular item, or may be a collection of one or more units of each of two or more heterogeneous items. A collection of units of item(s) (e.g., a case containing twelve units of an item, or a bundle containing one or more units of each of two or more heterogeneous items, such as a boxed or bundled set of three different books) may thus be considered or treated as a "unit" in the order fulfillment process. A designation, or code, may thus also identify a collection of units of item(s) as a "unit" in the order fulfillment process. Thus, various, in addition to sorting individual units of items, may also process collections of units of item(s) designated as units. Therefore, the conveyance receptacles described herein may receive collections of units of item(s) that are designated as units as well as individual units of items.

Figure 3:
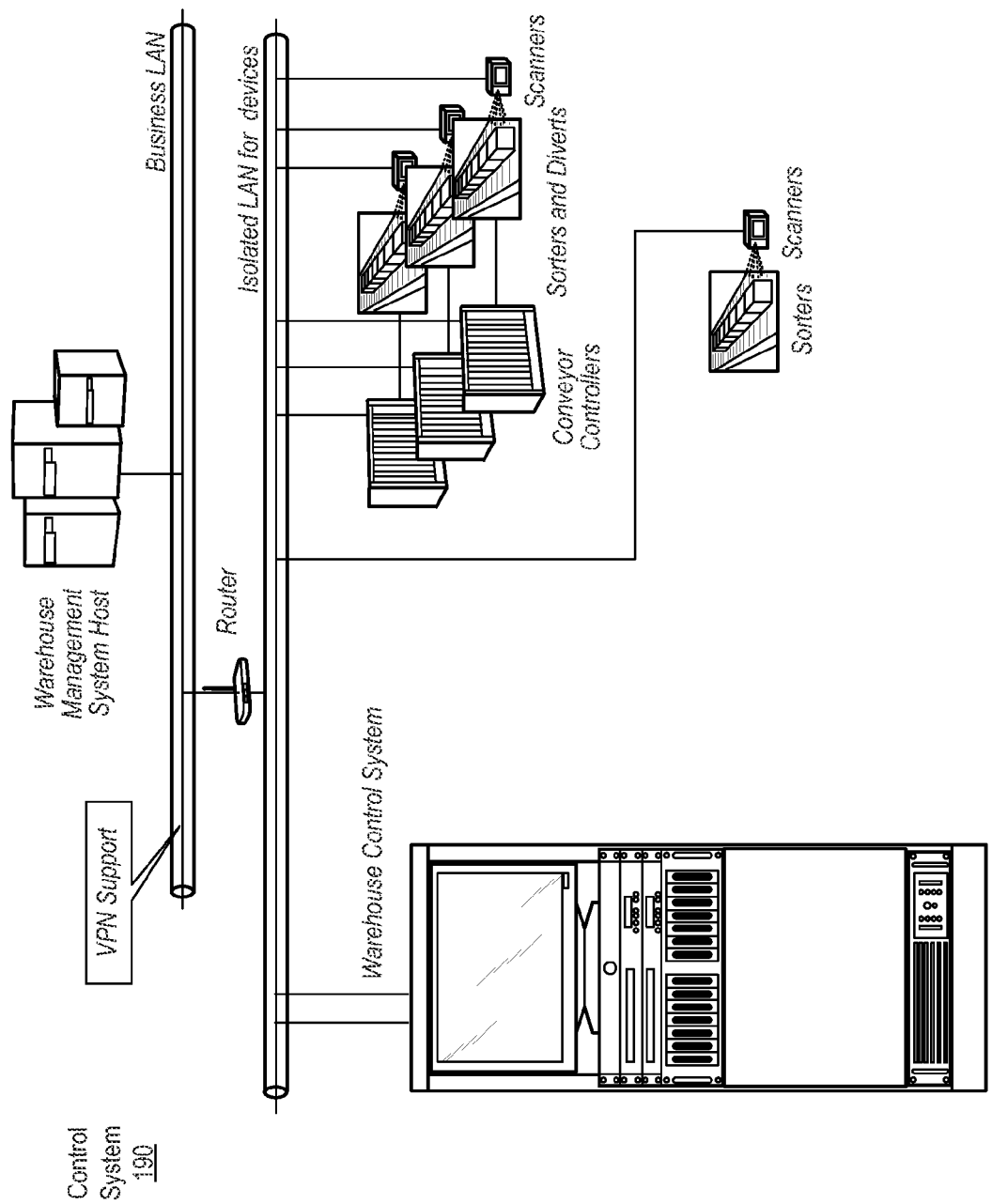
FIG. 3 depicts an example of a control system that may be employed in some embodiments.
Figure 8:
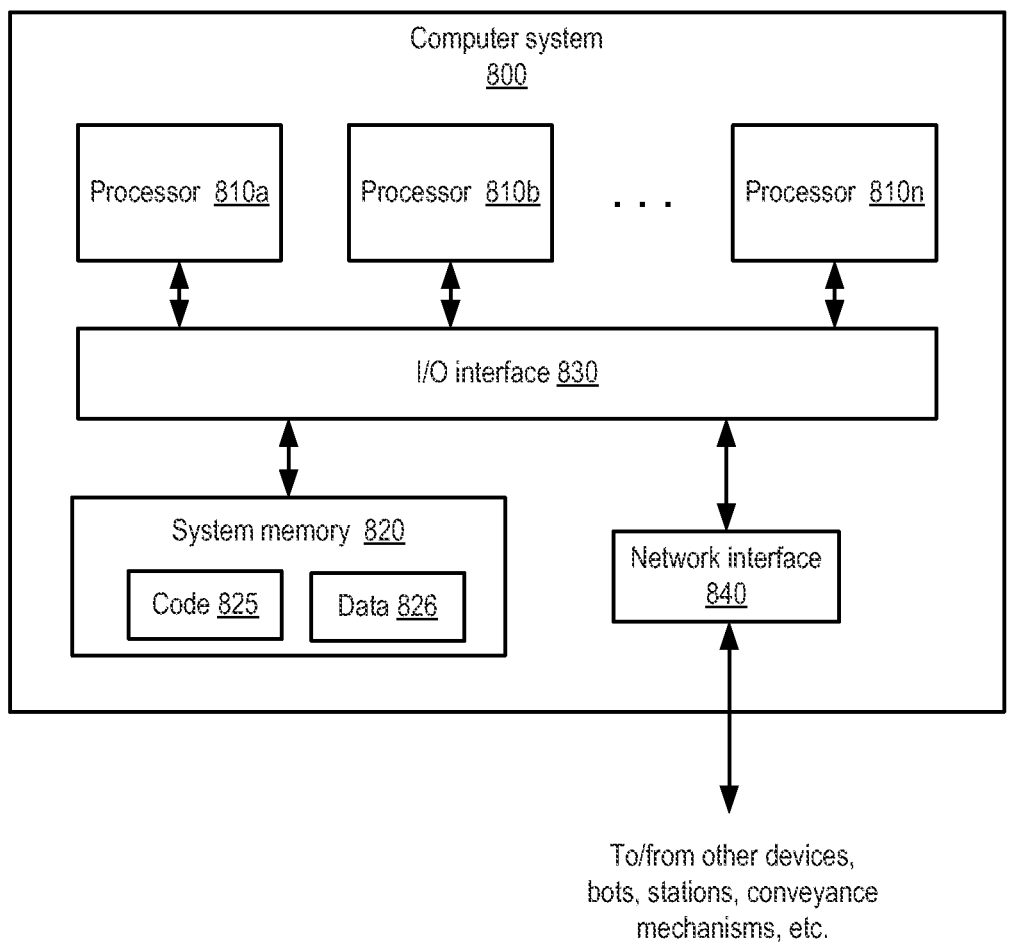
FIG. 8 is a block diagram illustrating an example computer system that may be used in at least some embodiments of the present modular material handling system.

A materials handling facility may include a control system 190 which may include, but is not limited to, one or more computer systems, one or more data storage devices, one or more wired and/or wireless networks, control system software (programs, modules, drivers, user interfaces, etc.), and one or more hand-held, mobile and/or fixed readers, scanners or scanning devices that may be able to scan, receive, or otherwise detect the marks or tags (e.g., bar codes, radio frequency identification (RFID) tags, etc.) on individual items (units) or collections of items (e.g., cases) and communicate with a control station or stations of the control system to, for example, determine and record the item and/or item type of the items. The hand-held, mobile and/or fixed readers, scanners or scanning devices may also be able to scan, receive, or otherwise detect the marks or tags (e.g., bar codes, radio frequency identification (RFID) tags, etc.) attached to or integrated with the conveyance receptacles. An exemplary computer system that may be used in a control system 190 is illustrated in FIG. 8. An exemplary network topology that may be used in control system 190 is shown in FIG. 3.

At the induction station, a pulled unit of an item may be associated with a particular conveyance receptacle by reading, scanning, etc. the item identifier associated with the item and the conveyance receptacle identifier associated with the conveyance receptacle into the control system 190. This may be performed manually (e.g., by an operator or agent using a hand-held scanner), via an automated scanning/reading process using fixed scanners/readers, or by a combination of manual and automatic scanning/reading. For example, an operator at an induction station may use a hand-held scanner to scan a code off the unit of the item before or during placement of the unit into a "staged" conveyance receptacle, while an automated reader may read (or may have already read) the conveyance receptacle identifier from the new conveyance receptacle that is "staged" for the operator to place the unit of the item into.

Once a pulled unit of an item is associated with and placed into a particular conveyance receptacle, that conveyance receptacle may be inducted into a conveyance mechanism (e.g., a conveyor belt, roller system, or other conveyance mechanism). In various embodiments, the conveyance mechanism may include a mechanism that includes some method of diverting a product off a conveyance path under control of the control system. Examples of such diversion mechanisms may include, but are not limited to, sliding shoe sorter mechanisms and pop up diversion mechanisms, such as pop up wheel sorter mechanisms. A pop up wheel sorter includes powered wheels that rise up out of the conveyor to divert product off the conveyor onto a different path or to a location. Other types of mechanisms may be used in various embodiments.

A conveyance receptacle may already be on the conveyance mechanism when the unit is associated with and placed into the receptacle. Alternatively, a conveyance receptacle may be retrieved from a conveyance receptacle storage, stack, or other supply, the unit may be associated with and placed into the receptacle, and the receptacle may then be inducted into or placed on the conveyance mechanism. The conveyance receptacles need not be fixed to the conveyance mechanism; instead, the receptacles may be removable bins, trays, totes, or similar devices. The conveyance mechanism may be coupled to and controlled by the materials handling facility control system 190 via wired and/or wireless communications. The control system 190 may receive input from and send commands to the conveyance mechanism to direct or control various operations of the conveyance mechanism.

The above describes aspects of an induction station 210 in which a human operator performs at least a portion of the pulling of units of items from groups of picked items, scanning/reading the items and receptacles to associate single units of items to particular conveyance receptacles, and placing the units into the conveyance receptacles. In alternative embodiments, some or all of the activities described as being performed by a human operator may be performed by automated mechanisms, which may be coupled to and under control of the materials handling facility control system 190.

The conveyance mechanism, under direction of control system 190, may deliver the conveyance receptacles, each including an individual unit of an item, to various order processing modules 55. Various ones of the processing modules 55 (or elsewhere in processing area 50) may include one or more sorting stations. Portions of an order may be received from the agents 42, or from other stations, at a processing area 50 at different times. Thus, processing at a station may have to wait for one or more items for some orders to be delivered to the station from picking and/or from another station before completion of processing of a multi-item order at the sorting station.

The picked units of items that in some cases are delivered to a processing area via the conveyance receptacles may be processed at routing module 52. For example, routing module 52, under the direction of control system 190, may in some embodiments sort the individual picked units in accordance with their respective orders. In other embodiments, the picked units may be sorted into their respective orders at one or more of processing modules 55 under the direction of control system 190. As discussed in greater detail below, various processing modules 55 may provide differing types of packaging operations that may be suitable for differing picked items (e.g., based on the size of the item), or differing order category (e.g., multi-item orders, single-item orders)

An order fulfillment center may also include one or more receiving 80 operations for receiving shipments 90 of stock from various vendors. The received stock may then be placed into stock storage. The receiving 80 operation may also receive and process returned, purchased, or rented items from customers. The various operations and stations of an order fulfillment center may be located in one building or facility, or alternatively may be spread or subdivided across two or more buildings or facilities.

Turning now to FIG. 3, one exemplary embodiment of control system 190 is depicted. Control system 190 may in some cases include a host warehouse management system (Host WMS) in coordination with various localized control system components, such as one or more warehouse control systems (WCS), sensors, conveyor-specific controllers (e.g., programmable logic controllers), and other motion-control components. For example, the Host WMS may in some embodiments provide high-level instruction as to routing and scheduling of items to particular modules of the system, whereas the WCS may execute lower-level tasks related to execution of the routing and scheduling the conveyance of the inventory items in accordance with the routing dictated by the Host WMS (e.g., messaging proper zones within the modular material handling system). Other embodiments may include a more centralized configuration in which a central host oversees most or all of the material handling functions, of alternately a more distributed configuration in which most or all of the material handling functions are handed off between area-specific controller components.

Physical Layout of Modular Material Handling System

Figure 4:
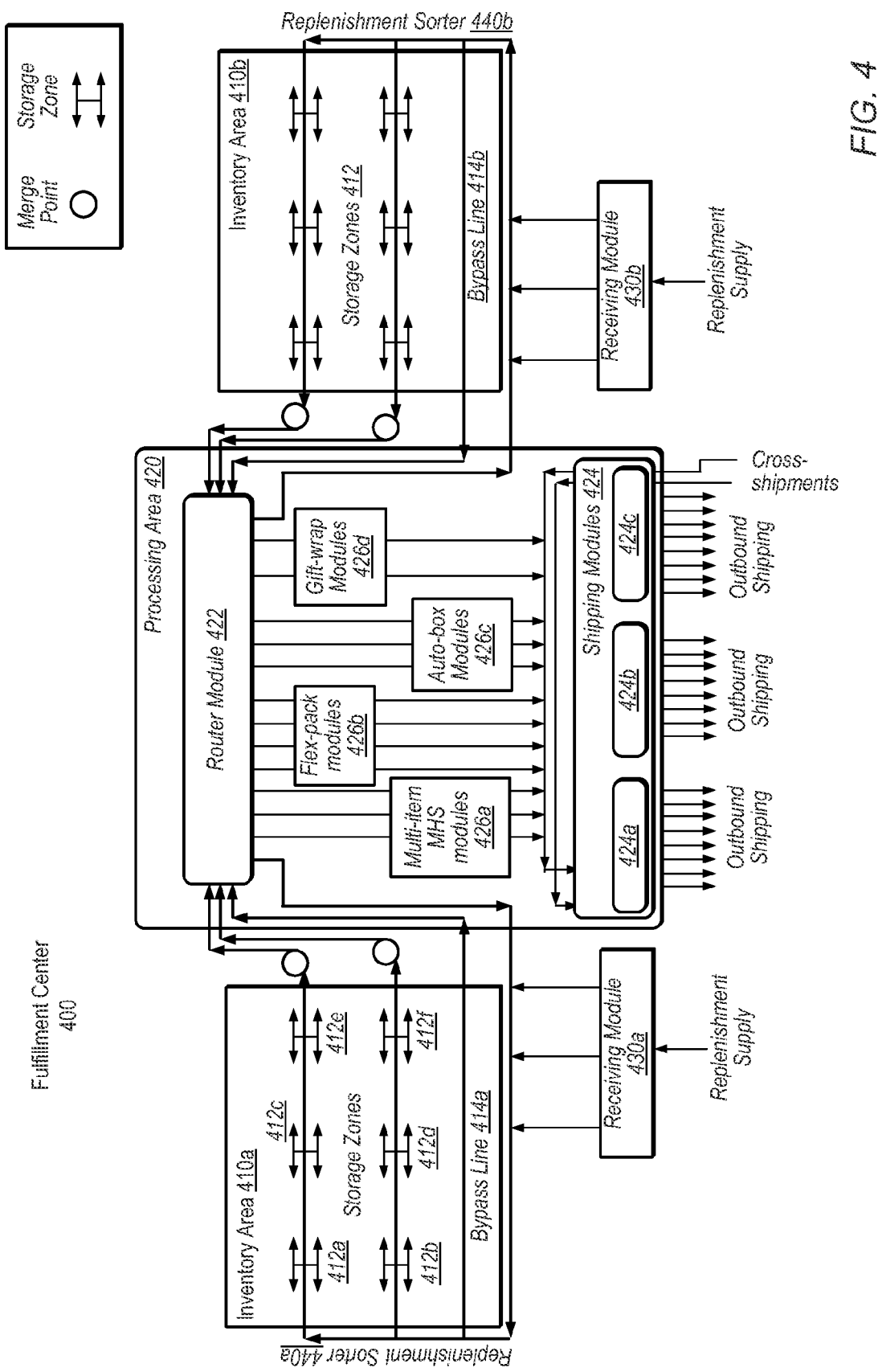
FIG. 4 illustrates an exemplary physical layout of a materials handling facility, according to one of the present embodiments.

FIG. 4 presents greater detail of the physical layout of one embodiment of the present disclosure. In the depicted embodiment, processing area 420 is located between inventory areas 410a and 410b, with router module 422 of processing area 420 receiving/sending inventory items to/from each of inventory areas 410a and 410b via conveyor mechanisms. By virtue of this layout, which includes multiple smaller individual inventory areas distributed around the processing area, the maximum distances that picked inventory items must travel (e.g., from the farthest end of an inventory area to the router module of the processing area) are lower than distances that may be encountered in configurations having a single equivalent, larger inventory area (e.g., an inventory area having a volume equal to the combined volume of inventory areas 410a and 410b) located adjacent to the processing area. Accordingly, pick-to-ship times may be minimized by use of this physical layout. Other embodiments may provide similar benefits by use of more than two inventory areas disposed around a processing area. In some embodiments, multiple inventory areas may be located adjacent to various sides of processing area 420 in an asymmetric layout.

The physical layout of fulfillment center 400 depicted in FIG. 4 may further improve inventory item throughput by virtue of the availability of additional conveyance paths between processing area 420 and the two inventory areas 410a and 410b. For example, twice as many conveyor lines of a minimal length L between the two inventory areas and router module 422 may be possible in the embodiment of FIG. 4, as compared to an embodiment in which only a single inventory area is employed on one side of router module 422. In some embodiments, control system 190 may maximize material throughput by exploiting the availability of additional conveyance paths. For example, a high demand item may be stored in both inventory area 410a and in the oppositely disposed inventory area 410b to take advantage of the availability of a maximum number of conveyance mechanisms. In such a way, it may be possible to double the throughput of extremely high demand items.

The factory layout may provide additional opportunities for efficiency improvement, based on a more centralized distribution of personnel that may be achieved by the central location of processing area 420. For example, the greater concentration of operators due to centrally located processing area 420 may provide for more efficient management of those operators (e.g., via lower ratios manager to operator ratios).

Embodiments of fulfillment center 400 may include control system 190 that is configured to dynamically adjust inventory placement strategies as demands change. For example, it may initially be beneficial to store inventory of a particular low demand product at inventory area zones that are relatively distant from router module 422. Such an arrangement may allow higher demand items to be stored at inventory locations that are nearer router module 422. This may be desirable because an item at storage zone 412a will have a longer pick-to-ship time than an item picked at storage zone 412e). It may also be desirable for simplicity reasons to store the particular low demand product together at one particular storage zone 412 within inventory area 410.

Now consider a scenario in which demand increases dramatically for the above-discussed item. It may be beneficial to relocate the suddenly high-demand product to a more desirable area of the inventory areas (e.g., storage zone 412e). If demand is exceptionally high, it may also be desirable to relocate the high demand product across multiple storage zones 412, in order to avoid possible backlog at conveyance mechanisms (e.g., due to excessive conveyance receptacles/totes overwhelming a particular conveyor line) and/or at a picking module. In such a case, relocating the high demand product to multiple storage zones (e.g., storage zones 412e and 412f of inventory area 410a, as well as additional zones in inventory area 410b) may eliminate the sources of backlog. Inventory items may be relocated within the inventory areas by use of, for example, bypass lines 414a and 414b, which route materials through router module 422.

Continuing with FIG. 4, router module 422 serves as the interface between inventory areas 410 and the various processing modules 426. As discussed above, router module 422 receives conveyed inventory items from pick modules within inventory areas 410. In some embodiments, the inventory items are received via conveyance receptacles (e.g., standardized totes) that are transported via conveyance mechanisms (e.g., conveyor lines). The conveyance receptacles may not be fixed to the conveyance mechanism in various embodiments. In some cases, other methods for conveying the inventory items are employed (e.g., various robotic form factors, automated guided vehicles). Control system 190 may govern the conveyance of the inventory items (e.g., via the a Host WMS and a supporting WCS) to router module 422, and the subsequent routing of inventory items to processing modules 426. Various identifying methods (e.g., RFID tags, barcode scanner, QR scanners located, for example, on the conveyance receptacles) may be employed to track the movement of the inventory items).

In some embodiments, router module 422 provides one or more standardized interfaces (e.g., physical conveyer interface, data interface, power interface) to various processing modules 426 that are coupled to router module 422 for receiving inventory items. These standardized interfaces may be expandable to accommodate varying numbers of processing modules 426. In this way, router module 422 may support flexible configuration of the type and number of processing modules 426 employed in a fulfillment center.

Various embodiments of router module 422 pass along received conveyance receptacles. In other cases, router module 422 may perform some redistribution (e.g., re-toting) of inventory items prior to conveying materials to one or more processing modules 426.

Figure 7:
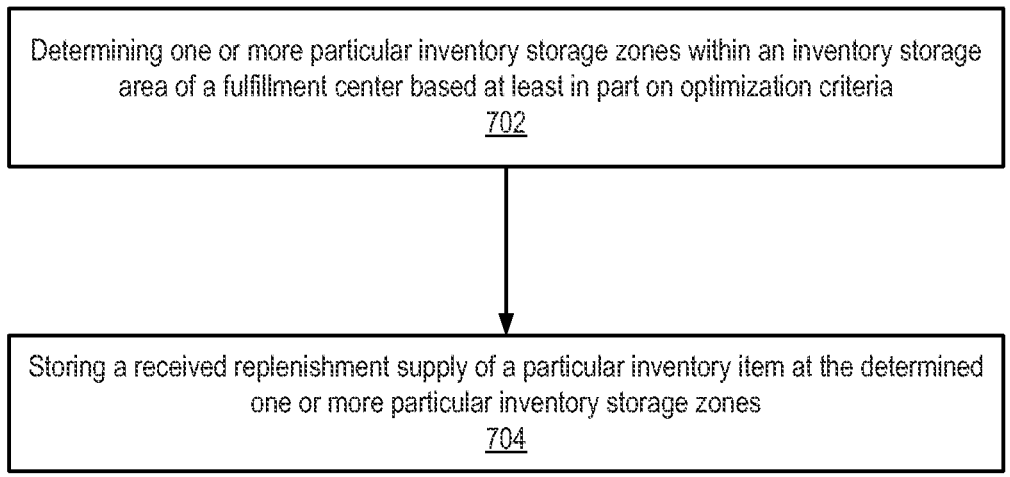
FIG. 7 is a flowchart illustrating various aspects of one present embodiment.

FIG. 7 presents a flowchart illustrating a method of operation in a modular material handling system that may be used to optimize inventory storage strategies. Such strategies may provide, for example, reduced receive-to-stow time and/or reduced pick-to-ship time. At 702, inventory storage locations (zones) within one or more inventory storage areas of a fulfillment center are determined. In some embodiments, this determination is based on minimizing distances that the item must be conveyed in order to stow or to subsequently pick and process the item. In some cases, the determination may estimate effects of the storage density of the particular item, or the storage density as to all items in the vicinity of the various storage zones. Storage densities may be meaningful because high storage density of high-demand items may increase probabilities that heavy pick activity or heavy stow activity within a localized area (e.g., the storage zone) may create bottlenecks.

Processing Modules

Various processing modules 426 provide configurable functionality that may include processing and packaging inventory items and customer orders of various types. For example, FIG. 4 depicts a configuration of processing area 420 that includes three multi-item material handling system modules 426a, four flex-pack modules 426b, three auto-box modules 426c, and two gift-wrap modules 426d. These modules are configured in a modular manner to interface with router module 422 and shipping module 424.

Figure 5:
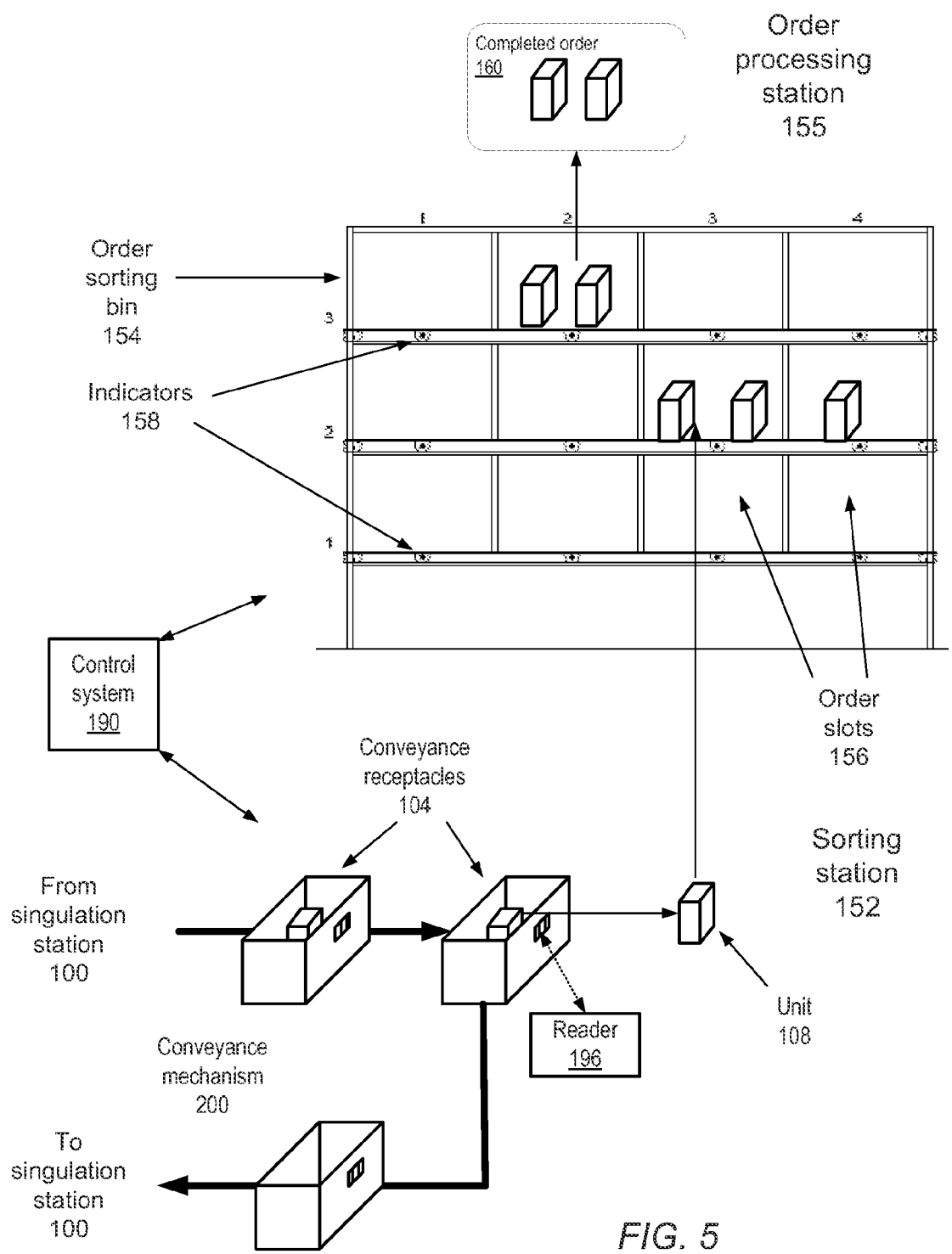
FIG. 5 illustrates operation of an exemplary sorting station that may be used in processing modules of some of the present embodiments.

Multi-item material handling system modules 426a may provide capabilities for handling inventory items that are received in conveyance receptacles containing, for example, multiple inventory items corresponding to multiple customer orders. These inventory items may also correspond to customers orders containing multiple inventory items. FIG. 5 illustrates operation of an exemplary sorting station that may be used for assembling these multi-item orders in embodiments of multi-item material handling system modules 426a, or in other processing modules 426 or router module 422 in some embodiments. Initially, conveyance receptacles containing multiple items are divided to single item conveyance receptacles 104. Once the conveyance receptacles 104, each containing an individual unit 108 of an item and each associated with the item it contains, are inducted into the conveyance mechanism 200, at least some of the receptacles 104 may be conveyed to sorting station 152. In one embodiment, the conveyance mechanism may be directed by the control system 190 as to the disposition of each particular conveyance receptacle 104. Each conveyance receptacle 104 may be associated with the particular item it contains. Thus, the control system 190 may, by tracking a particular conveyance receptacle 104 via its unique conveyance receptacle identifier 106, direct the conveyance mechanism to route the particular conveyance receptacle 104 and its associated unit 108 of the item to sorting station 152.

There may be one or more order processing stations 155 associated with sorting station 152. In this example, an order processing station 155 is located on the other side of order sorting bin 154. Order processing station 155 may, for example, be a packing station at which one or more units 108 of items for an order are processed, packed, and labeled for shipping to the customer. The order slots 156 may be pass-through slots into one side of which units 108 of items may be placed, and out of which individual or collections of units 108 of items may be removed for processing. In one embodiment, units 108 of items may be removed from conveyance receptacles 104 and placed into a particular slot (e.g., item 108 is illustrated as being placed into slot (3, 2)) as indicated by the control system 190, for example by the control system 190 activating an indicator 158 associated with the slot 156 into which the unit 108 is to be placed to indicate to the operator that the unit 108 from the current receptacle 104 is to be placed into that slot 156. Sorting bin 154 may also include indicators associated with the slots 156 on the order processing station 155 side which control system 190 may activate to indicate to operators at the order processing station 155 that a particular slot 156 is ready to be processed (e.g., that all units 108 of all items for an order have been placed into that slot). In this example, control system has indicated to operator(s) at order processing station 155 that an order 160 in slot (2, 1) has been completed. An operator may then pull the order 160 from the slot 156 for further processing (e.g., shipping).

Continuing with FIG. 4, flex-pack modules 426b may provide functionality for processing items that are inappropriate for other processing modules 426 due to, for example, size and/or weight of the items. In some embodiments, an operator may remove a tote from the conveyor and places it on a work shelf to perform manual operations. Carts may be utilized to assist in processing large items.

Auto-box modules 426c may provide for automated packaging of items conforming to certain particular dimensional constraints. In some cases, applicability of auto-box modules 426 may be limited to packaging of single-item orders. Other embodiment include auto-box modules 426 that may provide automated packaging of multi-item orders. As discussed in greater detail below with regard to FIGS. 9 and 10, some embodiments of auto-box modules may provide for automated, high throughput continuous flow processing of both single-item and multi-item orders.

Gift-wrap modules 426d may facilitate gift wrap of packages corresponding to customer orders requesting gift wrapping. In some embodiments, personnel may perform the required packaging as directed by the control system 190. However, in some embodiments automated wrapping of packaging conforming to particular dimensional constraints, similar to the auto-box modules 426c, may be performed.

Continuing with FIG. 4, receiving modules 430 may be arranged in some embodiments to minimize receive-to-stow time. For example, multiple receiving modules 430 may be implemented to optimally correspond to the various inventory areas 410. These receiving modules may convey replenishment supply to replenishment sorter 440, that may serve to optimize storage of items (e.g., under control of control system 190) based on various criteria, such as minimization of pick and/or stow times.

In various embodiments, shipping module 424 may provide for sorting and/or routing of processed inventory items (e.g., packaged items) based on factors such as, for example, package type (e.g., flat packages, large crates, standard boxes, expedited delivery, cross-shipment of items to other fulfillment centers), and, in some cases, for further processing that may be required prior to shipment (e.g., verification of labeling). Some embodiments may include shipping modules 424 having various discrete modules that respectively correspond to one or more particular package types. As one example configuration, shipping modules 424 depicted in FIG. 4 may include flat package module 424a for sortation of flat packages, carton module 424b for sortation of standard cartons, and special handling module 424c for sortation of items that may require custom handling (e.g., large items, items corresponding to expedited orders). In some other embodiments, a single shipping module 424 may be used for shipments of all package types processed by processing modules 426.

Shipping module 424 may include one or more standardized interfaces (e.g., physical conveyer interface, data interface, power interface) to various processing modules 426 that deliver processed inventory items to shipping module 424. These standardized interfaces may be expandable to accommodate configurations having varying numbers of processing modules 426. In this way, shipping module 424 may support flexible configuration of the type and number of processing modules 426 employed in a fulfillment center.

Various embodiment of the present disclosure may be configured to receive and process items from other fulfillment centers. As one example, a particular fulfillment center may receive cross-shipped items from one or more other fulfillment center to replenish stock of the particular fulfillment center. As another example, cross-shipped items may be received by the particular fulfillment center in order to complete an order that is processed at the particular fulfillment center (e.g., packaged as part of a multi-item order, packaged as a single-item order). In such cases, a cross-shipped item may be received and appropriately routed via, for example, one or more of a storage area, a routing module, a processing module, a shipping module, etc.

In some embodiments, the conveyance mechanisms may be configured to convey received items to a storage area for inventory replenishment purposes, deliver picked items from a storage area to the processing area for order processing, and for transporting empty conveyance receptacles to areas of need. For example, a particular conveyance mechanism, such as a conveyor, may be employed to perform each of the above-mentioned tasks of transporting items for storage and for processing, as well as transporting empty receptacles for from, for example, the packaging or shipping modules to the receiving module or inventory areas for further use.

Figure 6:
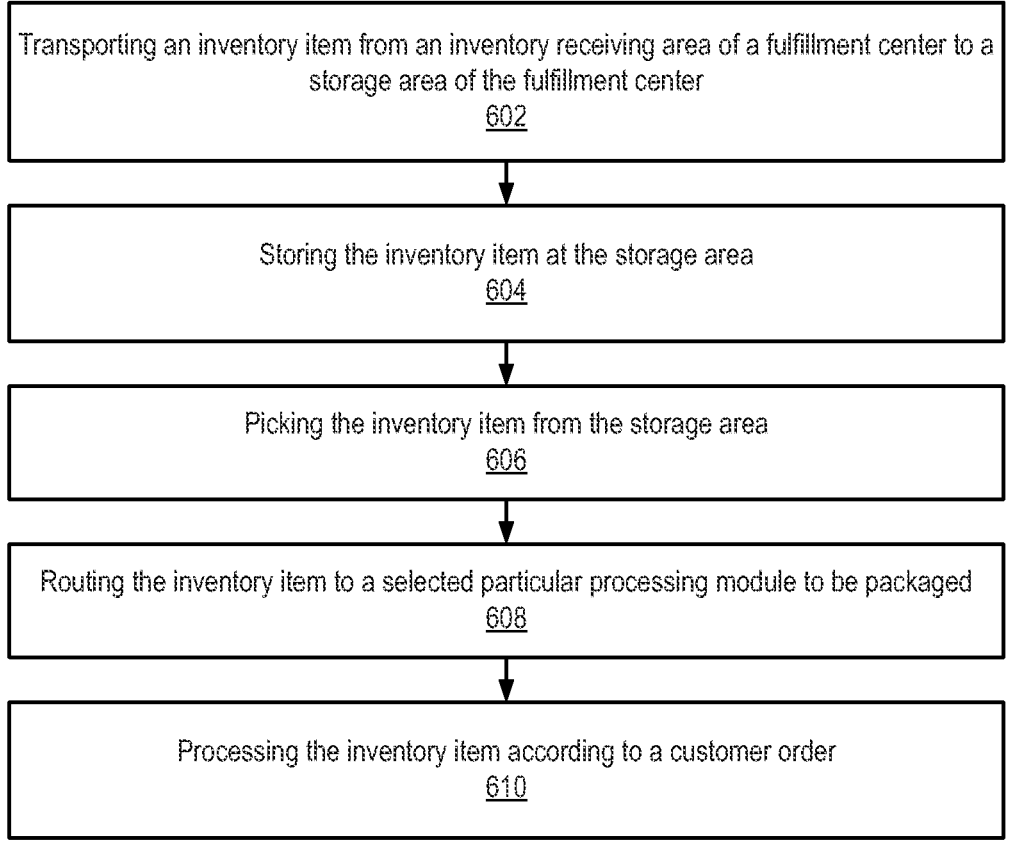
FIG. 6 is a flowchart illustrating a method of operation of one of the present embodiments.

FIG. 6 is a flowchart illustrating a method of operation in a modular material handling system for use in a fulfillment center, according to one embodiment. This flowchart illustrates how the various components described herein, such as a controller system, routing module, processing module, shipping module, inventory area, processing area, and processing modules, for example, may be integrated to form a modular material handling system for use a fulfillment center. The method as illustrated in FIG. 6 may be performed as a continuous or near-continuous process by modular material handling system to process incoming items for replenishment, or to process items picked from storage to fulfill customer orders.

At 602, an inventory item (e.g., inventory replenishment) may be transported from an inventory receiving area to a storage area of the fulfillment center. Transportation may be by way of a non-linear conveyor system (e.g., conveyance totes are not fixed to a conveyor, and therefore items need not be linearly delivered). In other embodiments, transportation may involve automated guided vehicles, robotics, manual transfer, etc. At 604, the item may be stored at the storage area (e.g., placed in inventory).

At 606, the inventory item may be picked from the storage area in response to a received order. For example, based on a customer's order for a particular item, that item may be picked from inventory. The picking may be performed using a computer system, and may also in some cases involve various automated picking systems. The picking process may be performed using a computer system that may, in some embodiments, optimize material throughput through methods that result in mixed groupings of items (e.g., items corresponding to different orders being grouped together).

At 608, the picked inventory item may be routed to one or more processing modules with the fulfillment center. The routing may be accomplished by way of the controller system and a routing module that may provide a standard interface to various processing modules. At 610, the picked inventory item may be processed using, for example, one or more modular processing modules that interface to the routing module and a shipping module. In some embodiments, the processing may be in accordance with various information corresponding to a customer order. For example, this customer order information may include customer selection of gift wrapping with an order (e.g., may result in processing of items in that order via a gift-wrapping module), customer selection of expedited shipping (e.g., may result in different order handling), customer status with respect to a loyalty program (e.g., may result in variations in order fulfillment). As another example, customer selection of a group of various items within a single customer order may in some cases result in processing via one or more modules that facilitate combining multiple parts into a single shipment.

Example Processing Module

Figure 9:
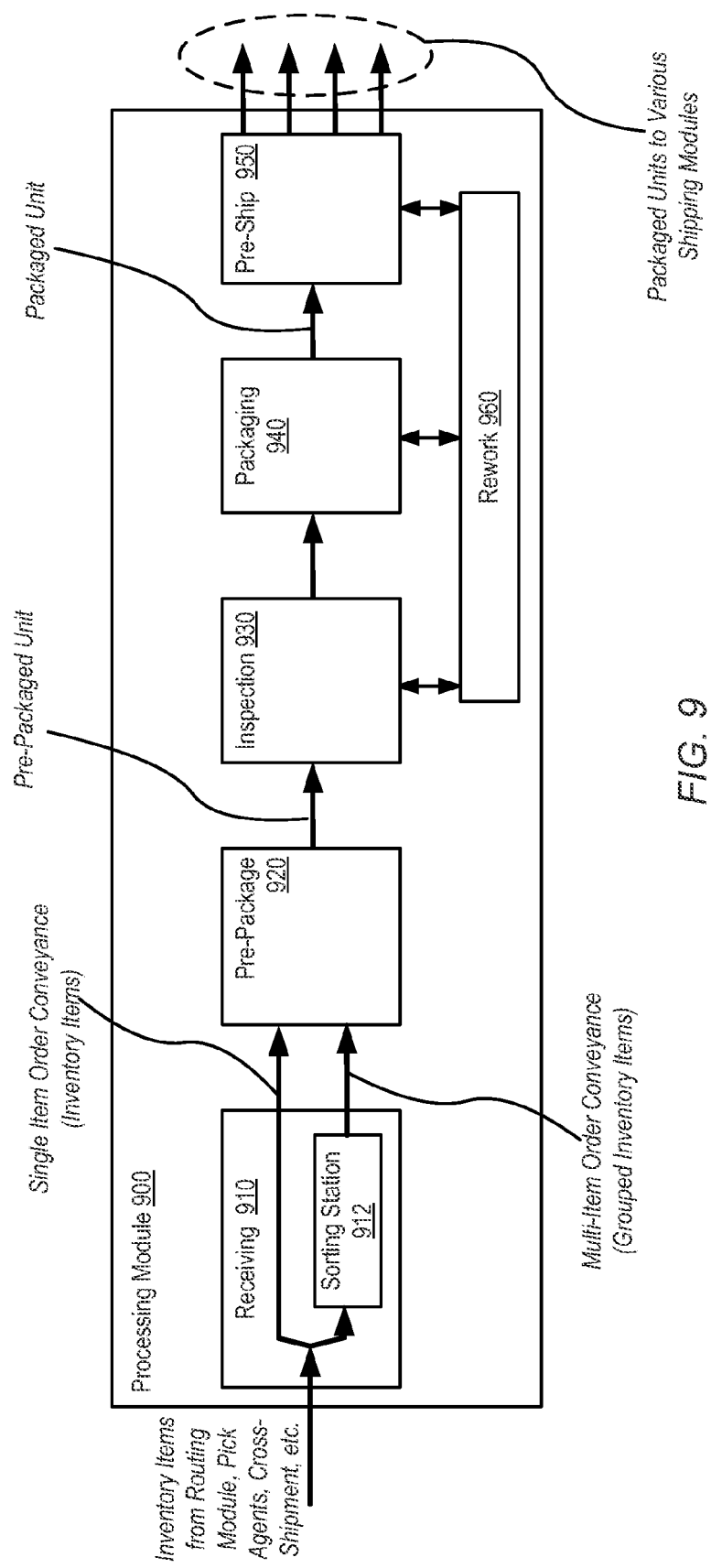
FIG. 9 illustrates an exemplary layout that may be used in various processing modules in some of the present embodiments.
Figure 10:
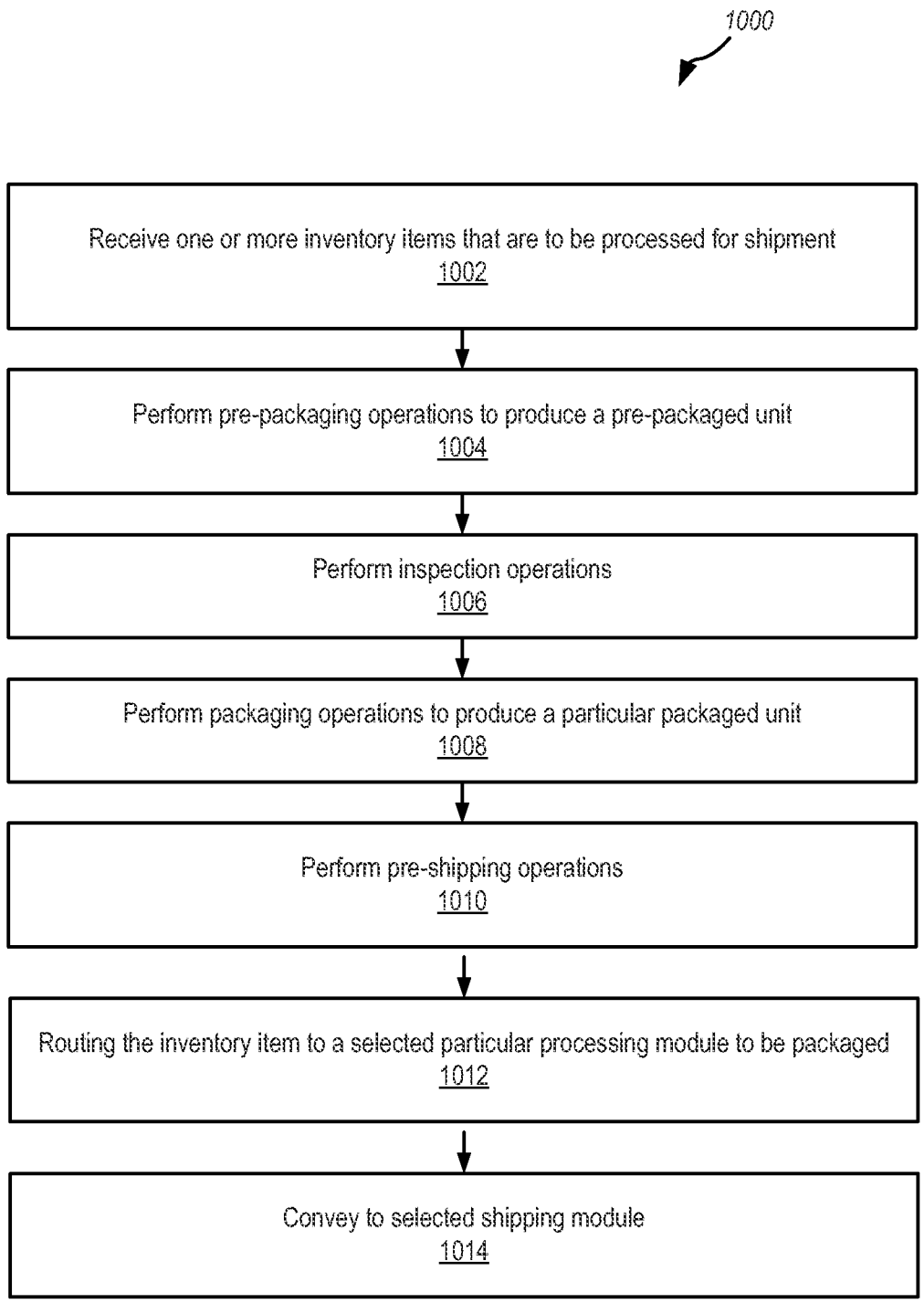
FIG. 10 is a flowchart illustrating a method of operation according to one of the present embodiments.

As mentioned above, particular configurations of auto-box processing modules may be used in embodiments of the present disclosure to provide flexibility in item/order handling capabilities (e.g., through simultaneous handling of both single-item and multi-item orders) while providing for high throughput, continuous flow processing via the use of automated package assembly and optimized processing module line design. Examples of these flexible auto-box processing modules are illustrated in FIGS. 9 and 10. As discussed above with respect to the general design principles employed in various embodiments of the present disclosure, these exemplary flexible auto-box modules are modular in design, and may interface to router module 422 and shipping modules 424 via one or more standardized interface (e.g., physical conveyer interface, data interface, power interface) in order to ensure expandability and configurability within processing area 420. In some embodiments, the flexible auto-box modules may alternately interface to one or more modules other than router module 422 and shipping module 242. For example, in some cases, it may be beneficial to configure one or more modular, flexible auto-box modules as receiving items from another processing module, such as multi-item material handling system modules 426a (e.g., in a serial processing arrangement). In other implementations, it may be beneficial to configure one or more modular, flexible auto-box modules as receiving items from pick agents, from cross-shipment from other fulfillment centers, etc.

Turning now to FIG. 9, flexible auto-box processing module 900 may include receiving station 910, pre-packaging station 920, inspection station 930, packaging station 940, and pre-ship station 950, which may be coupled by one or more conveyance mechanisms (e.g., conveyor belts, tracked or untracked vehicles, other robotic means) for transporting various inventory items for processing and packaging. Referring also to FIG. 10, processing module 900 may accomplish processing tasks by initially receiving one or more inventory items that are to be processed for shipment (1002) at receiving station 910. The received inventory items may be routed to receiving station 910 by router module 422 (see FIG. 4).

In the embodiment depicted in FIG. 9, receiving station 910 is configured to concurrently handle inventory items corresponding to single-item orders as well as inventory items corresponding to multi-item orders. To this end, the depicted embodiment includes receiving station 910 having both a single-item order conveyance mechanism and a multi-item order conveyance mechanism. The multi-item order conveyance mechanism may include sorting station 912 for collecting and sorting various inventory items corresponding to a multi-item order. As noted above, these various inventory items may be delivered to receiving station 910 within multiple, separate batches and/or streams of materials. Therefore, the various inventory items of a single multi-item order may arrive at receiving station 910 at varying times. Thus, sorting station 912 may accomplish collection and sorting of received inventory items into groups corresponding to a particular multi-item order by employing techniques such as those described above with respect to sorting station 152, as depicted in FIG. 5. Once completed, these collected groups of inventory items corresponding to a multi-item order may be transported to pre-packaging station 920. In various embodiments, sorting station 912 may include manual and/or automated techniques for accomplishing the sorting. For example, scanning devices such as bar code readers, QR code readers, and RFID devices may be used to identify particular inventory items in an automated manner. Vision-based recognition systems may in some cases also be employed.

Item routing instructions may be provided to receiving station 910 and sorting station 912 by, for example, router module 422. Embodiments of processing module 900 may employ different technologies during single item order conveyance and multi-item order conveyance. As one example, a present embodiment may deliver single item order materials via conveyance receptacles non-linearly conveyed on one or more conveyor belts, and may deliver grouped items corresponding to multi-item orders via, for example, tracked or untracked carts that may be automated or manually moved.

As sorting and grouping of inventory items at sorting station 912 may necessarily create some processing-related cost to all materials that pass through sorting station 912 (e.g., due to overhead required to identify, determine whether to re-bin, and/or divert materials as part of the sorting operation), the efficiency with which items corresponding to single-item orders may be processed may be maximized by including one or more single item order conveyance mechanisms traversing receiving station 910 by entirely bypassing sorting station 912 when delivering items to pre-packaging station 920. Such a material flow architecture not only minimizes delays in delivering single-item order materials, but also reduces the load imposed on the multi-item order conveyance mechanism by removing the need for that conveyance mechanism to support single-item order traffic.

The items received at pre-packaging station 920 may be subject to pre-packaging operations (1004) to produce a pre-packaged unit that facilitates automated packaging operations. These pre-packaging operations may provide the capability of processing module 900 to concurrently service more than one type of shipped item/order. A constraint that may exist with respect to automated packaging provided by packaging station 940 may be the need to limit number of different package dimensions that may be concurrently supported, in order to allow efficient automated packaging construction. For example, the highest throughput may in some cases be achieved if all concurrently serviced configurations of packaged orders have the same exterior packaging dimensions (e.g., the automated process in packaging station 940 building the same box for each of the concurrently serviced configurations). In some cases, reconfiguring the exterior packaging dimensions is possible, but may require a shutdown of the process. For example, in some embodiments packaging station 940 may be able to support multiple sets of exterior packaging dimensions, but may be able to support only one at a time. Thus, an exemplary packaging station 940 may be configurable to support any one of exterior packaging dimensions A, B, C, and D, but a change from supporting packaging dimension A (only) may require a reconfiguration that results in supporting only dimension B.

Such commonality of exterior packaging dimension may be supported by assembling pre-packaged units that may include various different items (and in some cases including differing numbers of items), but that produce various pre-packaged units that are each compatible with the same auto-assembled packaging. These prepackaged units may in some cases be automatically built around pre-packaged units (1008) at packaging station 940 (e.g., using high-speed wrap-around cartoning equipment). Compatible pre-packaged units may be achieved by use of different configurations of pre-packaging substrates (e.g., trays, bases, or other configuration of packaging fixture) to which the varying inventory items are fixed. Varying geometries of such packaging substrates may be used in some cases to accommodate different inventory items, or combinations of inventory items. In other cases, the same configuration of substrate may be used for different inventory items (or combinations of inventory items), and different configurations of auxiliary packing material may be used to ensure compatibility with a common size of auto-assembled external packaging. The pre-packaging operations may be accomplished in various embodiments by manual and/or automated processes.

In some embodiments, the inventory items included in the pre-packaged unit may be retained together, and in some cases may be securely fixed to the packaging substrates by positive mechanical means, such as by shrink wrapping. Other embodiments may employ substrates having suitable geometry and compliance to provide, for example, an inference fit with the included inventory items. Substrates may also employ mechanical means for securing the pre-packaged unit to the outer packaging that is assembled in packaging station 940. For example, some substrates may have features (e.g., tabs or slots) that provide an interference fit to corresponding features (e.g., matching slots or tabs) in the auto-assembled outer packaging.

It should be noted that a multi-module system may benefit from a configuration that contains multiple processing modules 900, such that at least some of the processing modules 900 are configured to support different packaged unit sizes (e.g., based on different external packaging sizes). In such a way, a router module or other entity that feeds processing modules 900 may be able route a wide variety of items and order configurations (e.g., corresponding to multiple external packaging sizes).

Various embodiments of the present disclosure include inspection station 930 for performing inspection operations (1006) on the pre-packaged units, prior to auto-assembly of packaging at packaging station 940. These inspection operations may verify that the outer dimension of the pre-packaged unit conform to specifications required for successful auto-assembly of external packaging at packaging station 940. For example, errors in the production of a pre-packaged unit may result in included inventory items being improperly oriented with respect to the substrate, and thus resulting in a pre-packaged unit of non-conforming dimension (e.g., an item may be incorrectly shrink wrapped to the substrate such that the outer dimension violate an envelope for the auto-assembled outer packaging). Inspection may in some cases be performed by using automated systems, such as vision systems employing a set of cameras. Other conventional methods of detecting object dimensions (e.g., photoelectric sensors, mechanical sensors) may also be used. In some embodiments, units detected as being non-conforming may be diverted to rework station 960 for rework or, if rework is not practical, recycling or scrapping.

Other verification steps may be performed in some cases at inspection station 930. For example, items may be weighed to verify that the aggregate weight of a pre-packaged unit corresponds to an expected weight (e.g., based on the known weights of the intended inventory items and the substrate) as a check to ensure accurate order fulfillment.

Various automatic cartoning technology that may be used at packaging station 940 in certain embodiments may require that specific pre-packaged unit alignment criteria be met (e.g., precise placement and/or orientation at entry to the automatic cartoning systems). In such cases, alignment steps may be performed at one or more of various appropriate locations, such as upon entry to packaging station 940 (e.g., precise alignment immediately prior to entry into an automatic cartoning machine), preceding exit from inspection station 930 (e.g., precise alignment performed as the end of inspection), and/or at entry into inspection station 930 (e.g., precise alignment prior to inspection). Various alignment steps may also be performed at various other portions of processing module 900 (e.g., at pre-packaging station 920, receiving station 910).

Figure 11:
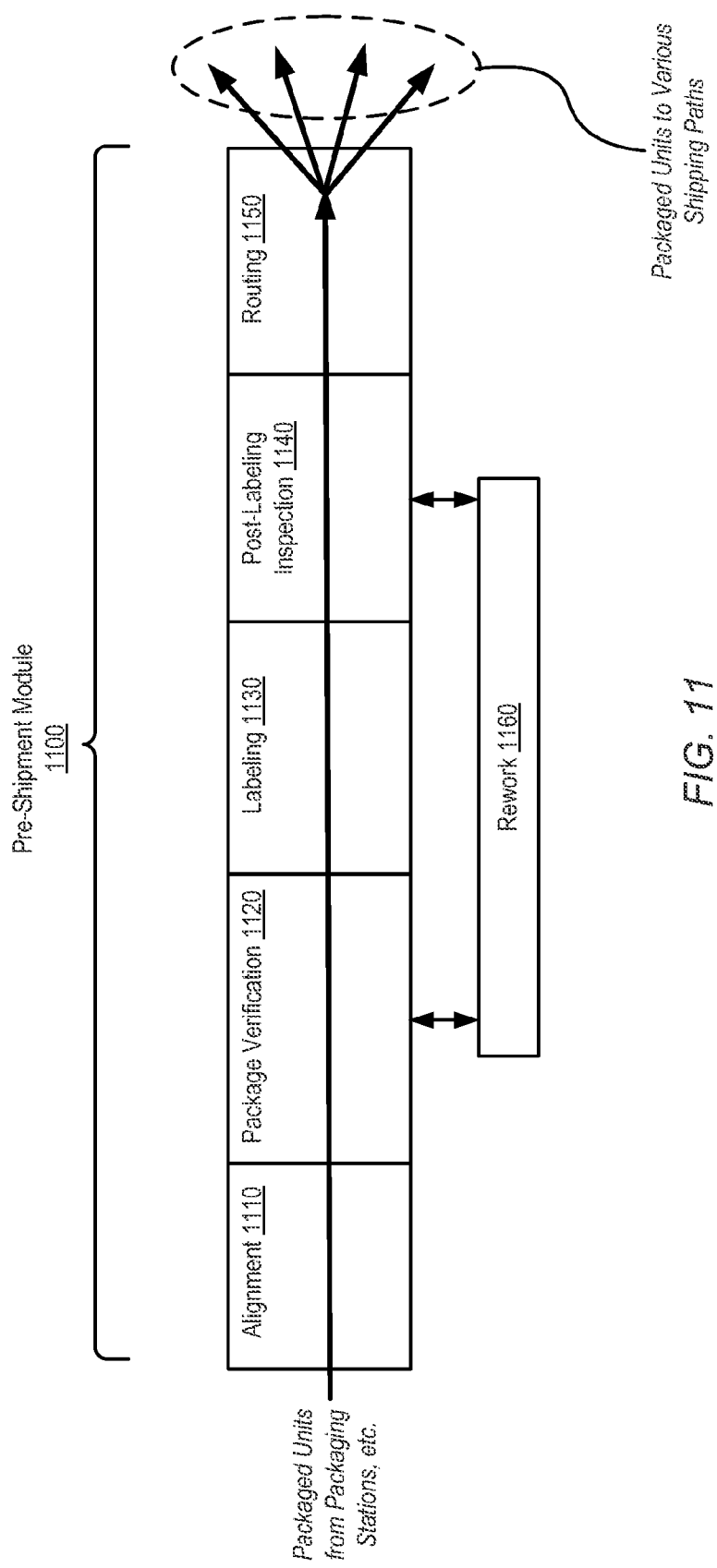
FIG. 11 depicts an exemplary layout of portions of a pre-shipment package processing module, according to some of the present embodiments.

In some embodiments, pre-shipping operations may be performed (1014) at pre-ship station 950 to accomplish various post-packaging tasks that may be optimally performed prior to sending the packaged unit to a shipping dock or shipping module. For example, in some embodiments, processing module 900 may include pre-ship station 950 that is configured to add appropriate shipping labels to a packaged unit, perform final quality assurance operations, and/or select appropriate shipping module from a plurality of possible shipping modules based on, for example, the dimensions of the package unit, requested shipping methods, priority of the associated order, and/or various other criteria. An example of a pre-shipment module is depicted in FIG. 11, and a flowchart is presented in FIG. 12, which are each discussed in detail below. Various embodiments may include a pre-shipment module that is not part of processing module 900, but is instead a standalone module. Other embodiments may not include a pre-shipment module, and may instead place the various functionality described herein in a shipping module that prepares packages for final shipment (e.g., palletizing, loading), and/or at various other modules. Other embodiments may not provide the discussed functionality.

In some embodiments, additional verification and/or quality assurance steps may be performed at various other stations, such as receiving station 910, pre-packaging station 920, packaging station 940, and/or pre-ship station 950 instead of, or in addition to the above-discussed verification steps that may be performed at inspection station 930. For example, it may be desirable to verify that a shipping label is properly readable at pre-ship station 950, just prior to shipping. Performance of dimensional and/or weight verification may, in certain cases, be desirable at various ones of the different areas of processing module 900. In some cases, these additional verification and/or quality assurance steps may result in non-conforming units found at one or more of the various other stations being diverted for rework (e.g. at rework station 960), recycling, or scrapping.

Example Pre-Shipping Processing Module

Figure 12:
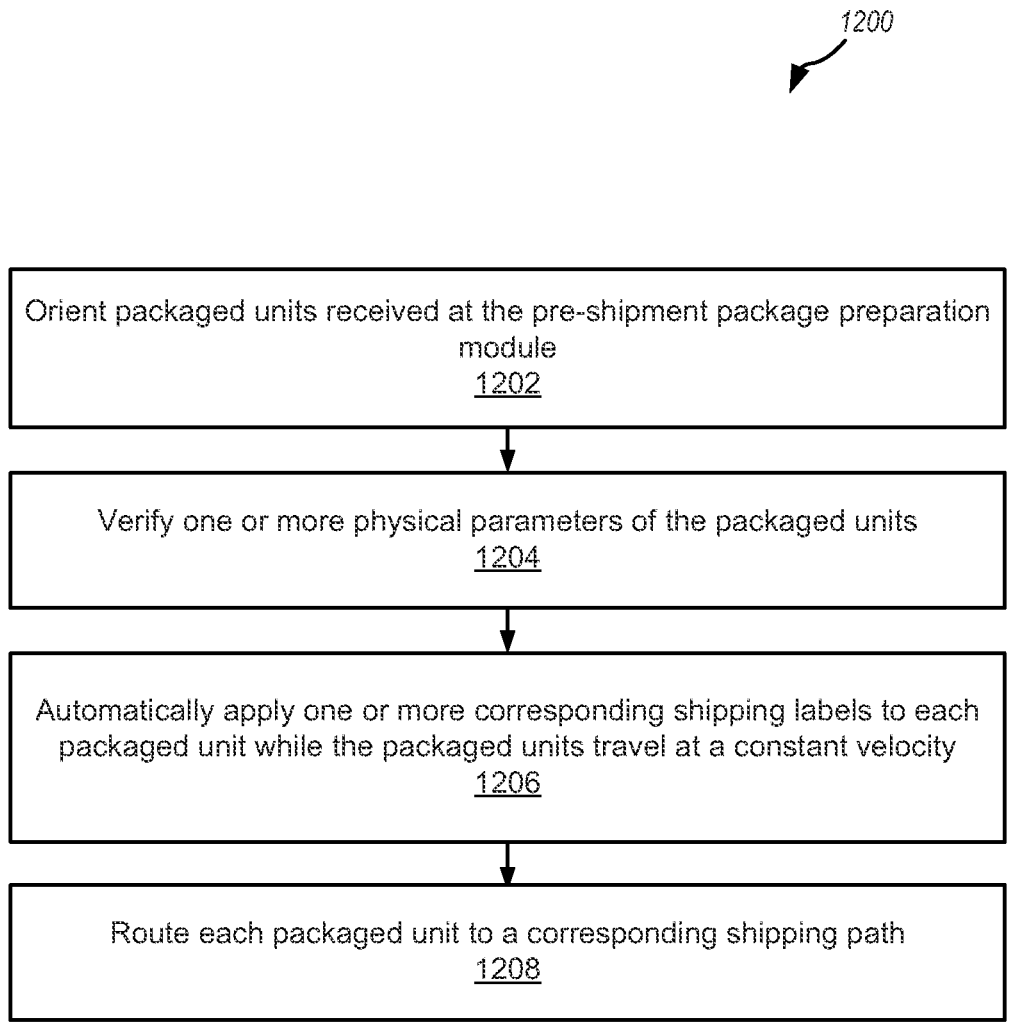
FIG. 12 is a flowchart illustrating a method of operation according to one of the present embodiments.

Turning now to FIGS. 11 and 12, an exemplary pre-shipment module 1100 that may be implemented as, for example, a component of processing module 900 or as a stand-alone module is depicted. As shown, pre-shipment module 1100 may include various sections providing various functionality, such as alignment section 1110, package verification section 1120, labeling section 1130, post-labeling inspection section 1140, and routing section 1150. Other embodiments may include some subset of these sections, and/or additional functionality that may be beneficially performed subsequent to packaging, and prior to shipping.

As shown in the layout of FIG. 11 and the flow chart of FIG. 12, alignment section 1110 may serve to properly orient packaged units (1202) in preparation for traversal through other sections of pre-shipment module 1100. In embodiments in which pre-shipment module 1100 conveys packaged units using belt conveyor-type mechanisms, diagonally-oriented (with respect to belt direction) guides and diagonal rollers are examples of conventional methods that are well suited for implementation in pre-shipment module 1100.

Package verification section 1120 may receive conveyed packaged units from alignment section 1110, and verify parameters of the packaged units (1204). Similar to the verification steps discussed above with respect to inspection station 930 of processing module 900, package verification section 1120 may ensure that packaged units are not of non-conforming size prior to introduction to automated processes of labeling section 1130. In certain instances, oversized packages may cause damage various automated processing equipment. In order to avoid such damage, packaged units found to be non-conforming may be removed (e.g., diverted to rework section 1150) using systems such as, for example, wheel diverters, shoe sorters, and pick-and-place devices.

Packaged units that are not removed at package verification section 1120 may proceed to labeling section 1130 to receive labeling (e.g., shipping labels), as well as other processing that my be required for shipping (e.g., regulatory documentation). Throughput of pre-shipment module 1100 may be optimized by applying labels to packaged units as they are conveyed through pre-shipment module 1100, without requiring the packaged units to alter the speed of conveyance, or to stop (1206).

Figure 13:
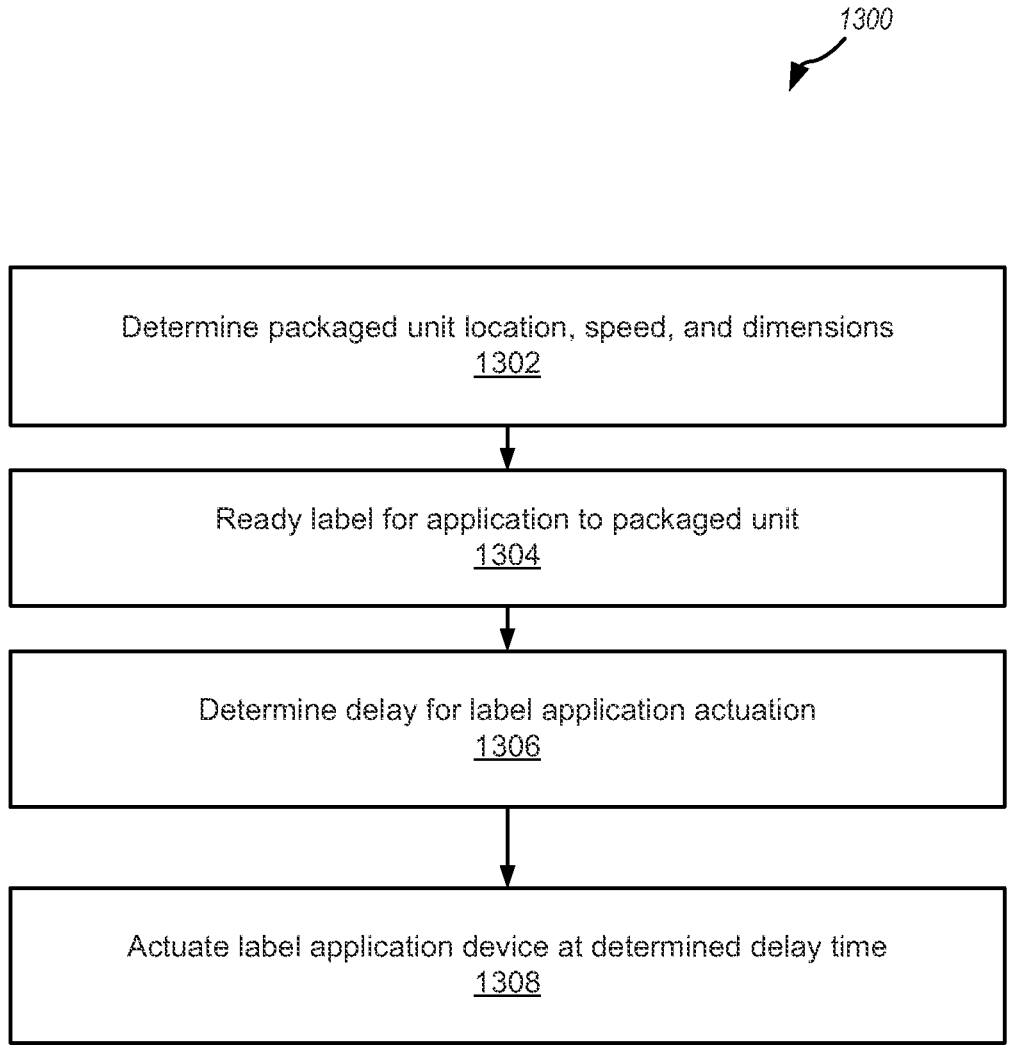
FIG. 13 is a flowchart illustrating a method of operation for application of shipping labels to packaged units, according to one of the present embodiments.

Referring also to FIG. 13, one method for such in-motion label application is presented. At 1302, a location, speed, and size of a moving packaged unit may be determined based on, for example, sensors and stored data. For example, a location may be known based on sensor information, such a signal from a photo detector or a mechanical switch. A speed may be determined based on a known speed of the conveyance mechanism, or alternately based on additional sensor measurements. Dimensions may be known based on stored data (e.g., matching stored data with a barcode identification of the packaged unit), or by measurement of the moving package (e.g., using cameras, detectors, or mechanical sensors). With this information, a delay time for actuating a label application device may be calculated (or obtained from a table).

For example, consider a case in which packages of varying heights are conveyed on a flat belt conveyor, and in which a shipping label application device includes an application arm that actuates from top-down to place a label on the top surface of a moving packaged unit. A horizontal distance of the packaged unit from the application arm (measured location of the moving packaged unit), a horizontal rate of travel of the moving packaged unit, a known (or commanded) vertical rate of travel of the actuation arm, and a vertical distance for the actuation arm to travel to contact the packaged unit (calculated from the height of the packaged unit and the original height of the application arm) may each be determined. Thus, sufficient information is available to calculate a delay time for the label application actuation arm to successfully apply the label to the moving packaged unit (1306).

Ahead of the actuation, a label may be made ready (1304) (e.g., printed, retrieved), and if a successful acknowledgment of the label being ready is not received, the moving packaged unit may be stopped to allow sufficient time for application of the label. If the label has timely been made ready, the label application arm may be actuated at the determined delay time to apply the label to the moving packaged units (1308). Multiple application arms may be placed serially in order to support higher throughput speeds. For example, if four label application arms are located on a single conveyance mechanism, each arm may only be required to label every fourth packaged unit on the conveyance mechanism. Accordingly, the conveyance mechanism could be run at a higher velocity, or alternately with a higher placement density of packaged units on the conveyance mechanism.

Referring again to FIG. 11, post-labeling inspection section 1140 may in some embodiments provide for verification (e.g., using automated processes such as vision-based inspection systems, manual inspection processes, or other inspection means) of various aspects, such as, for example, proper printing and application of labeling to the packaged units. In some cases, not conforming packaged units may be diverted to rework section 1160, or to recycling or scrap.

Returning now to FIG. 12, at 1208 the packaged units may be routed to a particular shipping path, which may be selected from a plurality of shipping paths. For example, routing section 1150 may be configured to select one of four possible shipping modules for a particular packaged unit, based at least in part on information relating to that unit. In one example, the four shipping modules may correspond to four different package thickness thresholds, each corresponding to a different shipping mode (e.g., letters, flat packages, small packages, large packages). In another example, one or several of the shipping modules may correspond to different shipping priorities (e.g., next-day deliver, three day delivery, standard ground). In various embodiments, the routing decision may be made based on information measured from the packaged units (e.g., heights, weights). In some embodiment, the routing decisions may be based on information stored (e.g., at a database), or based on directions from a central server of the fulfillment center. Routing may be accomplished via the use of systems such as, for example, wheel diverters, shoe sorters, and pick-and-place devices.

Throughout the various layouts discussed herein, it should be appreciated that in certain cases it may be beneficial from a material flow perspective to include buffer zones that may allow accumulation of work-in-progress pieces. Such buffer zones may mitigate problems that may arise when throughput mismatches temporarily arise between neighboring work centers. For example, it may be very advantageous to include buffer zones between packaging station 940 and pre-ship station 950 to accommodate possible temporary mismatches in throughput.

Illustrative System

In at least some embodiments, a system that implements one or more components of modular materials handling system that implements the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a control system in a robotic induction technique and/or in a non-linear, unit-level materials handling system that implements the robotic induction technique, are shown stored within system memory 820 as code 825 and data 826.

In at least some embodiments, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network 800, such as other computer systems, communications devices, control mechanisms, readers, scanners and so on that are components of a robotic induction technique and/or of a non-linear, unit-level materials handling system that implements the robotic induction technique. The communications channels may include, but are not limited to conventional and mobile telephone and text messaging communications channels. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above for FIGS. 1 through 7 for implementing a control system for, or possibly other components of, modular material handling in a fulfillment center. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 800 via I/O interface 830. A computer-accessible medium may also include any volatile or non-volatile media such as RAM (e.g. SDRAM, DDR SDRAM, RDRAM, SRAM, etc.), ROM, etc, that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A pre-shipment package preparation module, comprising:
    an alignment section configured to orient packaged units received at the pre-shipment package preparation module;
    a package verification section configured to receive the packaged units from the alignment section and to verify one or more physical parameters of the packaged units;
    a labeling section configured to:

receive the packaged units from the package verification section, and automatically apply one or more corresponding shipping labels to each packaged unit while the packaged units travel at a constant velocity from the packaging verification section and through the labeling section; and a routing section configured to receive the packaged units from the labeling section, and to route each packaged unit to a corresponding shipping path selected from a plurality of shipping paths, wherein the corresponding shipping path for a given packaged unit is selected based on information associated with the given packaged unit.

2. The pre-shipment package preparation module of claim 1, wherein the package verification section is further configured to determine customer order information associated with individual ones of the packaged units; and wherein the pre-shipment package preparation module is configured to select the corresponding shipping path based on the determined customer order information.

3. The pre-shipment package preparation module of claim 1, wherein the one or more physical parameters verified by the package verification section includes heights of the packaged units; and wherein the pre-shipment package preparation module is configured to divert ones of the packaged units that are determined, using the package verification section, to have a height exceeding a maximum height specification for the labeling section.

4. The pre-shipment package preparation module of claim 1, wherein the one or more physical parameters verified by the package verification section includes weights of the packaged units; and wherein the pre-shipment package preparation module is configured to divert ones of the packaged units that are determined, using the package verification section, to have weights that are inconsistent with expected weights of the packaged units.

5. The pre-shipment package preparation module of claim 1, wherein the packaged units traveling at the constant velocity while the labeling section automatically applies the one or more corresponding shipping labels includes at least two types of packaged units that differ from each other in height.

6. The pre-shipment package preparation module of claim 5, wherein the pre-shipment package preparation module is configured to select the corresponding shipping path for the given packaged unit based on the height of the given packaged unit.

7. The pre-shipment package preparation module of claim 1, wherein the pre-shipment package preparation module is configured to select the corresponding shipping path for a given packaged unit based on information received from a fulfillment center central server.

8. The pre-shipment package preparation module of claim 1, wherein the labeling section is further configured to print the one or more corresponding shipping labels.

9. A computer system, comprising:

one or more processors;

memory, coupled to the one or more processors, having instructions stored thereon that in response to execution by the computer system, cause the computer system to perform operations comprising:

causing an alignment section of a pre-shipment package preparation module to orient packaged units received at the pre-shipment package preparation module, causing a package verification section of the pre-shipment package preparation module to receive the packaged units from the alignment section and to verify one or more physical parameters of the packaged units, causing a labeling section of the pre-shipment package preparation module to receive the packaged units from the package verification section and to automatically apply one or more corresponding shipping labels to each packaged unit while the packaged units travel at a constant velocity through the labeling section, and causing a routing section of the pre-shipment package preparation module to receive the packaged units from the labeling section, and to route each packaged unit to a corresponding shipping path selected from a plurality of shipping paths, wherein the corresponding shipping path for a given packaged unit is selected based on information associated with the given packaged unit.

10. The computer system of claim 9, wherein the operations further comprise:

causing the package verification section to determine customer order information associated with individual ones of the packaged units; and causing the pre-shipment package preparation module to select the corresponding shipping path based on the determined customer order information.

11. The computer system of claim 9, wherein the operations further comprise:

causing the pre-shipment package preparation module to divert ones of the packaged units that are determined by the package verification section to have a height exceeding a maximum height specified for the labeling section.

12. The computer system of claim 9, wherein the one or more physical parameters verified by the package verification section includes weights of the packaged units; and wherein the operations further comprise causing the pre-shipment package preparation module to divert ones of the packaged units that are determined by the package verification section to have weights that are inconsistent with an expected weights of the packaged units.

13. The computer system of claim 9, wherein the packaged units traveling at the constant velocity while the labeling section automatically applies the one or more corresponding shipping labels includes at least two types of packaged units that differ from each other in height and at least two types of packaged units that differ from each other in length.

14. The computer system of claim 13, wherein the operations further comprise selecting the corresponding shipping path for a given packaged unit based on the height of the given packaged unit.

15. The computer system of claim 9, wherein the operations further comprise causing the labeling section to print the one or more corresponding shipping labels.

16. A method, comprising:

causing an alignment section of a pre-shipment package preparation module to orient packaged units received by the pre-shipment package preparation module, causing a package verification section of the pre-shipment package preparation module to receive the packaged units from the alignment section and determine heights of the packaged units, causing a labeling section of the pre-shipment package preparation module to receive the packaged units from the package verification section and to automatically apply one or more corresponding shipping labels to each packaged unit while the packaged units travel at a constant velocity through the labeling section, and causing a routing section of the pre-shipment package preparation module to receive the packaged units from the labeling section, and to route each packaged unit to a corresponding shipping path selected from a plurality of shipping paths, wherein the corresponding shipping path for a given packaged unit is selected based on information associated with the given packaged unit.

17. The method of claim 16, wherein causing the package verification section to determine heights of the packaged units comprises causing the package verification section of the pre-shipment package preparation module to determine heights of the packaged units prior to the packaged units being received at the labeling section; and diverting ones of the packaged units that are determined by the package verification section as having heights exceeding a maximum height for the labeling section.

18. The method of claim 16, further comprising:

causing a post-labeling inspection section of the pre-shipment package preparation module to determine whether ones of the one or more shipping labels are non-compliant; and diverting ones of the packaged units that are determined by the pre-shipment package preparation module to be non-compliant.

* * * * *